United States Patent
Walk et al.

(10) Patent No.: US 11,368,196 B2
(45) Date of Patent: *Jun. 21, 2022

(54) SYSTEMS AND METHODS FOR COMMUNICATING BY MODULATING DATA ON ZEROS IN THE PRESENCE OF CHANNEL IMPAIRMENTS

(71) Applicants: California Institute of Technology, Pasadena, CA (US); The Regents of the University of California, Oakland, CA (US); Technische Universität Berlin, Berlin (DE)

(72) Inventors: Philipp Walk, Pasadena, CA (US); Babak Hassibi, San Marino, CA (US); Peter Jung, Berlin (DE); Hamid Jafarkhani, Irvine, CA (US)

(73) Assignees: California Institute of Technology, Pasadena, CA (US); The Regents of the University of California, Oakland, CA (US); Technische Universität Berlin, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,762

(22) Filed: Mar. 17, 2021

(65) Prior Publication Data
US 2022/0052728 A1 Feb. 17, 2022

Related U.S. Application Data

(63) Continuation of application No. 17/013,525, filed on Sep. 4, 2020, now Pat. No. 10,992,353, which is a
(Continued)

(51) Int. Cl.
*H04B 7/0452* (2017.01)
*H04L 7/04* (2006.01)
(Continued)

(52) U.S. Cl.
CPC ........ *H04B 7/0452* (2013.01); *H04B 1/0475* (2013.01); *H04L 7/042* (2013.01); *H04L 7/048* (2013.01); *H04L 27/122* (2013.01)

(58) Field of Classification Search
CPC ..... H04B 7/0452; H04B 1/0475; H04L 7/042; H04L 7/048; H04L 27/122;
(Continued)

(56) References Cited

U.S. PATENT DOCUMENTS

| 3,683,162 A | 8/1972 | Jacob et al. |
| 4,071,906 A * | 1/1978 | Buss ....................... G06F 17/15 333/165 |

(Continued)

FOREIGN PATENT DOCUMENTS

| CN | 112042161 A | 12/2020 |
| CN | 114008985 A | 2/2022 |

(Continued)

OTHER PUBLICATIONS

International Preliminary Report on Patentability for International Application No. PCT/US2019/015480, Report dated Jul. 28, 2020, dated Aug. 6, 2020, 6 Pgs.
(Continued)

*Primary Examiner* — James M Perez
(74) *Attorney, Agent, or Firm* — KPPB LLP

(57) ABSTRACT

Communication systems and methods in accordance with various embodiments of the invention utilize modulation on zeros. Carrier frequency offsets (CFO) can result in an unknown rotation of all zeros of a received signal's z-transform. Therefore, a binary MOCZ scheme (BMOCZ) can be utilized in which the modulated binary data is encoded using a cycling register code (e.g. CPC or ACPC), enabling receivers to determine cyclic shifts in the BMOCZ symbol resulting from a CFO. Receivers in accordance with several
(Continued)

embodiments of the invention include decoders capable of decoding information bits from received discrete-time baseband signals by: estimating a timing offset for the received signal; determining a plurality of zeros of a z-transform of the received symbol; identifying zeros from the plurality of zeros that encode received bits by correcting fractional rotations resulting from the CFO; and decoding information bits based upon the received bits using a cycling register code.

20 Claims, 23 Drawing Sheets
(19 of 23 Drawing Sheet(s) Filed in Color)

Related U.S. Application Data continuation of application No. 16/785,279, filed on Feb. 7, 2020, now Pat. No. 10,804,982.

(60) Provisional application No. 62/802,578, filed on Feb. 7, 2019.

(51) Int. Cl.
    *H04B 1/04*     (2006.01)
    *H04L 27/12*    (2006.01)

(58) Field of Classification Search
    CPC ............. H04L 27/2627; H04L 27/2639; H04L 27/2649; H04L 27/2663; H04L 49/55–557; H04L 25/0204; H04L 1/004; H04L 1/0041–0048; H04L 1/005; H04L 1/0051–0059; H04L 1/006; H04L 1/0061–0069; H04L 1/007; H04L 1/0071–0078; H04J 11/00
    See application file for complete search history.

(56) References Cited

U.S. PATENT DOCUMENTS

| | | | | |
|---|---|---|---|---|
| 4,095,225 A * | 6/1978 | Erikmats | ............... | G01S 13/288 342/195 |
| 4,736,663 A * | 4/1988 | Wawrzynek | ............. | G10H 1/08 331/78 |
| 4,797,923 A * | 1/1989 | Clarke | .................... | G01J 3/453 324/76.12 |
| 4,802,222 A * | 1/1989 | Weaver | .................. | H03G 7/007 375/240 |
| 5,073,907 A * | 12/1991 | Thomas, Jr. | .......... | H03L 7/1075 375/376 |
| 5,077,760 A * | 12/1991 | Lepage | .................. | H03M 7/40 375/368 |
| 5,337,266 A * | 8/1994 | Arnold | .................. | G06F 1/0356 708/517 |
| 6,373,859 B1 * | 4/2002 | Jedwab | .................... | H04L 1/004 370/479 |
| 6,850,562 B1 * | 2/2005 | Dornstetter | ....... | H04L 25/03203 375/229 |
| 6,853,726 B1 * | 2/2005 | Moskowitz | .......... | G06T 1/0028 375/E7.089 |
| 7,243,294 B1 * | 7/2007 | Divsalar | ............. | H03M 13/258 714/755 |
| 7,307,565 B1 | 12/2007 | Melanson | | |
| 7,616,701 B2 * | 11/2009 | Ungerboeck | ..... | H04L 25/03343 375/242 |
| 8,135,082 B2 * | 3/2012 | Choi | ................... | H04L 27/3488 375/264 |
| 9,503,303 B2 * | 11/2016 | Lee | ....................... | H04L 1/0041 |
| 9,705,723 B2 * | 7/2017 | Kim | ..................... | H04L 1/0075 |
| 9,837,990 B1 * | 12/2017 | Pagnanelli | ............ | H03M 3/322 |
| 10,797,926 B2 * | 10/2020 | Walk | .................. | H04L 27/2639 |
| 10,804,982 B2 * | 10/2020 | Walk | ................... | H04L 27/2676 |
| 10,992,353 B2 * | 4/2021 | Walk | ................... | H04L 27/2676 |
| 10,992,507 B2 * | 4/2021 | Walk | ................... | H04L 27/2649 |
| 2003/0023584 A1 * | 1/2003 | Brandin | ................ | G06F 16/986 |
| 2004/0004565 A1 | 1/2004 | Melanson | | |
| 2004/0151142 A1 * | 8/2004 | Li | ........................... | H04L 7/042 370/335 |
| 2005/0041746 A1 * | 2/2005 | Rosen | .................. | H04B 1/7163 375/242 |
| 2005/0100076 A1 * | 5/2005 | Gazdzinski | .......... | H04B 1/7176 375/130 |
| 2006/0045197 A1 * | 3/2006 | Ungerboeck | ....... | H04L 27/3427 375/261 |
| 2007/0086539 A1 * | 4/2007 | Hocevar | ............ | H03M 13/1188 375/267 |
| 2007/0089019 A1 * | 4/2007 | Tang | .................. | H03M 13/1102 714/752 |
| 2008/0122496 A1 * | 5/2008 | Wagner | ..................... | G06J 1/00 327/107 |
| 2008/0198933 A1 * | 8/2008 | Srinivasan | ............. | H04N 19/34 375/240.18 |
| 2008/0240448 A1 * | 10/2008 | Gustafsson | ............... | H04S 7/30 381/17 |
| 2009/0092326 A1 * | 4/2009 | Fukuhara | ............. | H04N 19/176 382/233 |
| 2010/0310009 A1 * | 12/2010 | Lakkis | ............... | H04L 27/2003 375/308 |
| 2010/0316172 A1 * | 12/2010 | Keehr | .................... | H04B 1/109 375/344 |
| 2012/0063635 A1 * | 3/2012 | Matsushita | ........... | G06T 1/0028 382/100 |
| 2012/0183056 A1 * | 7/2012 | He | ........................ | H04N 19/33 375/240.12 |
| 2014/0056341 A1 * | 2/2014 | Karabinis | ................ | H04K 3/25 375/219 |
| 2015/0171890 A1 * | 6/2015 | Pagnanelli | .......... | H03M 1/0836 341/143 |
| 2017/0077945 A1 * | 3/2017 | Pagnanelli | ............. | H03M 3/50 |
| 2017/0110141 A1 * | 4/2017 | Craven | ................ | G10L 19/022 |
| 2017/0117944 A1 * | 4/2017 | Ram | .................... | H04B 7/0413 |
| 2017/0118050 A1 * | 4/2017 | Ram | ................. | H04L 25/03891 |
| 2017/0195831 A1 * | 7/2017 | Cronie | ................. | H04B 5/0037 |
| 2018/0152204 A1 * | 5/2018 | Halbawi | .............. | G06F 11/1076 |
| 2019/0238379 A1 * | 8/2019 | Walk | .................. | H04L 27/2663 |
| 2020/0259534 A1 * | 8/2020 | Walk | .................... | H04B 1/0475 |
| 2020/0403664 A1 * | 12/2020 | Walk | .................. | H04L 27/2676 |
| 2020/0403837 A1 * | 12/2020 | Walk | .................. | H04L 27/2649 |

FOREIGN PATENT DOCUMENTS

| | | |
|---|---|---|
| EP | 1458156 A2 | 9/2004 |
| EP | 2675124 A2 | 12/2013 |
| EP | 3744057 A | 12/2020 |
| EP | 3921986 A1 | 12/2021 |
| KR | 20080098485 A | 11/2008 |
| KR | 20210139244 A | 11/2021 |
| WO | 2019148139 A1 | 8/2019 |
| WO | 2020163759 A1 | 8/2020 |

OTHER PUBLICATIONS

International Search Report and Written Opinion for International Application No. PCT/US2019/015480, Search completed Jun. 27, 2019, dated Jun. 27, 2019, 8 Pgs.

International Search Report and Written Opinion for International Application No. PCT/US2020/017289, Search completed Jun. 12, 2020, dated Jun. 12, 2020, 10 Pgs.

Abed-Meraim et al., "Blind System Identification", Proceedings of the IEEE, vol. 85, No. 8, 1997, pp. 1310-1322.

Ahmed et al., "Blind deconvolution using convex programming", IEEE Transaction on Information Theory, vol. 60, No. 3, 2014, pp. 1711-1732.

Andrews et al., "What Will 5G Be?", IEEE Journal on Selected Areas in Communications, vol. 32, No. 6, Jun. 2014, pp. 1065-1082.

(56) References Cited

OTHER PUBLICATIONS

Baeza et al., "Performance of a Non-Coherent Massive SIMO M-DPSK System", IEEE 86th Vehicular Technology Conference (VTC-Fall), Toronto, Ontario, Sep. 24-27, 2017, 5 pgs.

Bomer et al., "Long energy efficient Huffman sequences", International Conference on Acoustics, Speech, and Signal Processing, 1991.

Candes et al., "Phase retrieval via wirtinger flow: theory and algorithms", IEEE Transactions on Information Theory, vol. 61, No. 4, 2015, pp. 1985-2007.

Cassioli et al., "The Ultra-Wide Bandwidth Indoor Channel: From Statistical Model to Simulations", IEEE Journal on Selected Areas in Communications, vol. 20, No. 6, Aug. 2002, pp. 1247-1257, DOI: 10.1109/JSAC.2002.801228.

Chang et al., "Time synchronisation for OFDM-based WLAN systems", Electronics Letters, vol. 39, No. 13, 2003.

Choi, Jinho, "Noncoherent OFDM-IM and Its Performance Analysis", IEEE Transactions on Wireless Communications, vol. 17, No. 1, Jan. 2018, pp. 352-360.

Da Rocha et al., "Uniform constant composition codes derived from repeated-root cyclic codes", Electronics Letters, vol. 54, No. 3, Feb. 8, 2018, pp. 146-148.

Ding et al., "Ill-convergence of Godard blind equalizers in data communication systems", IEEE Transactions on Communications, vol. 39, No. 9, 1991, pp. 1313-1327.

Dong et al., "Optimal Design and Placemat of Pilot Symbols for Channel Estimation", IEEE Transactions on Signal Processing, vol. 50, 2002, pp. 3055-3069.

Ghassemzadeh et al., "UWB indoor delay profile model for residential and commercial environments", IEEE 58th Vehicular Technology Conference. VTC, Oct. 2003.

Gilbert, "Cyclically Permutable Error-Correcting Codes", IEEE Transactions on Information Theory, vol. 9, No. 3, Jul. 1963, pp. 175-182.

Golomb et al., "Comma-Free Codes", Canadian Journal of Mathematics, vol. 10, 1958, pp. 202-209.

Gustafson et al., "On mm-wave multipath clustering and channel modeling", IEEE Transactions on Antennas and Propagation, vol. 62, No. 3, Mar. 2014, pp. 1445-1455.

Haghighatshoar et al., "Massive MIMO Pilot Decontamination and Channel Interpolation via Wideband Sparse Channel Estimation", arXiv, Retrieved from: https://arxiv.org/abs/1702.07207v1, 2017, 33 pgs.

He et al., "Covert Wireless Communication With a Poisson Field of Interferers", IEEE Transactions on Wireless Communications, vol. 17, No. 9, Sep. 2018.

Huffman, "The Generation of Impulse-Equivalent Pulse Trains", IEEE Transactions on Information Theory, vol. 8, 1962.

Jaeckel et al., "QuaDRiGa: A 3-D Mutli-Cell Channel Model with Time Evolution for Enabling Virtual Field Trials", IEEE Transactions on Antennas and Propagation, vol. 62, No. 6, Jun. 2014, pp. 3242-3256.

Jaganathan, "Convex programming-based phase retrieval: theory and applications", PhD Thesis, California Institute of Technology, 2016.

Jaganathan et al., "Reconstruction of signals from their autocorrelation and cross-correlation vectors, with applications to phase retrieval and blind channel estimation", arXiv.org, Retrieved from: https://arxiv.org/abs/1610.02620, Oct. 9, 2016.

Jiang et al., "Packet detection by a single OFDM symbol in URLLC for critical industrial control: A realistic study", IEEE Journal on Selected Areas in Communications, vol. 37, No. 4, 2019, pp. 933-946.

Jose et al., "Pilot contamination and precoding in multi-cell TDD systems", IEEE Transactions on Wireless Communications, vol. 10, No. 8, Aug. 2011, pp. 2640-2651.

Kuribayashi et al., "How to Generate Cyclically Permutable Codes From Cyclic Codes", IEEE Transactions on Information Theory, vol. 52, No. 10, Oct. 2006, pp. 4660-4663.

Lee et al., "Effect of carrier frequency offset on OFDM systems for multipath fading channels", IEEE Global Telecommunications Conference, Globecom, 2004.

Lemos-Neto et al., "Cyclically permutable codes specified by roots of generator polynomial", Electronics Letters, vol. 50, No. 17, Aug. 14, 2014, pp. 1202-1204.

Levenshtein, "Combinatorial Problems Motivated By Comma-Free Codes", Journal of Combinatorial Designs, vol. 12, No. 3, Jan. 26, 2004, pp. 184-196.

Li et al., "Rapid, Robust, and Reliable Blind Deconvolution via Nonconvex Optimization", arXiv.org, Retrieved from: https://arxiv.org/abs/1606.04933, Jun. 15, 2016.

Liang et al., "A novel time of arrival estimation algorithm using an energy detector receiver in MMW system", EURASIP Journal on Advances in Signal Processing, vol. 2017, No. 1, Dec. 2017.

Liu et al., "A High-Efficiency Carrier Estimator for OFDM Communications", IEEE Communications Letters, vol. 2, No. 4, Apr. 1998, pp. 104-106.

Liu et al., "Analysis of energy detection receiver for TOA estimation in IR UWB ranging and a novel TOA estimation approach", Journal of Electromagnetic Waves and Applications, vol. 28, No. 1, pp. 49-63, Nov. 2013.

Luvisotto et al., "Physical layer design of high-performance wireless transmission for critical control applications", IEEE Transactions on Industrial Informatics, vol. 13, No. 6, 2017, pp. 2844-2854.

Luvisotto et al., "Ultra high performance wireless control for critical applications: Challenges and directions", IEEE Transactions on Industrial Informatics, vol. 13, No. 3, 2017, pp. 1448-1459.

Moose, "A Technique for Orthogonal Frequency Division Multiplexing Frequency Offset Correction", IEEE Transactions on Communications, vol. 42, No. 10, Oct. 1994, pp. 2908-2914.

Moose et al., "A technique for orthogonal frequency division multiplexing frequency offset correction", IEEE Transactions on Communications, vol. 42, No. 10, Oct. 1994, pp. 2908-2914.

Park et al., "Performance analysis of channel estimation for OFDM systems with residual timing offset", IEEE Transactions on Wireless Communications, vol. 5, No. 7, 2006, pp. 1622-1625.

Park et al., "Short-range wireless communications for next-generation networks: UWB, 60 GHz millimeter-wave WPAN, and ZigBee", IEEE Wireless Communications, vol. 14, No. 4, 2007, pp. 70-78.

Rappaport et al., "Millimeter wave mobile communications for 5G cellular: It will work!", IEEE Access, vol. 1, May 2013, pp. 335-349.

Redinbo et al., "Systematic Construction of Cyclically Permutable Code Words", IEEE Transactions on Communications, vol. 23, No. 7, Jul. 1975, pp. 786-789.

Sahinoglu et al., "Threshold-based TOA estimation for impulse radio UWB systems", IEEE International Conference on Ultra-Wideband, Sep. 2005.

Salous et al., "Millimeter-wave propagation: Characterization and modeling toward fifth-generation systems", IEEE Antennas and Propagation Magazine, vol. 58, No. 6, Dec. 2016.

Sayeed et al., "Secure Wireless Communications: Secret Keys Through Multipath", IEEE International Conference on Acoustics, Speech and Signal Processing, Las Vegas, Nevada, Mar. 31-Apr. 4, 2008, pp. 3013-3016.

Schmidl et al., "Low-overhead, low-complexity [burst] synchronization for OFDM", Proceedings of ICC/Supercomm 1996, International Conference on Communications, Jun. 23-27, 1996.

Schmidl et al., "Robust Frequency and Timing Synchronization for OFDM", IEEE Transactions on Communications, vol. 45, No. 12, Dec. 1997, pp. 1613-1621.

Tong et al., "A new approach to blind identification and equalization of multipath channels", 25th Asilomar Conference, 1991, pp. 856-860.

Tong et al., "Blind channel identification based on second-order statistics: a frequency-domain approach", IEEE Transactions on Information Theory, vol. 41, No. 1, 1995, pp. 329-334.

Tureli et al., "OFDM Blind Carrier Offset Estimation: ESPRIT", IEEE Transactions on Communications, vol. 48, No. 9, Sep. 2000, pp. 1459-1461.

(56) References Cited

OTHER PUBLICATIONS

Walk, "Ambiguities on convolutions with applications to phase retrieval", 2016 50th Asilomar Conference on Signals, Systems and Computers, Nov. 6-9, 2016.

Walk et al., "Blind Deconvolution with Additional Autocorrelations via Convex Programs", arXiv.org, 1701.04890, 2017.

Walk et al., "Constrained Blind Deconvolution using Wirtinger Flow Methods", 12th International Conference, Sampling Tehory and Applications, Jul. 2017, Tallinn, Estonia.

Walk et al., "Constrained Blind Deconvolution using Wirtinger Flow Methods", 2017 International Conference on Sampling Theory and Applications (SampTA), Jul. 3-7, 2017.

Walk et al., "MOCZ for Blind Short-Packet Communication: Basic Principles", IEEE Transactions on Wireless Communications, vol. 18, No. 11, pp. 5080-5097.

Walk et al., "MOCZ for Blind Short-Packet Communication: Some Practical Aspects", arXiv.org, Retrieved from: https://arxiv.org/abs/1902.02928, Feb. 8, 2019, 34 pgs.

Walk et al., "Noncoherent Short-Packet Communication via Modulation on Conjugated Zeros", arXiv.org, Retrieved from: https://arxiv.org/abs/1805.07876, May 21, 2018.

Walk et al., "On the Stability of Sparse Convolutions", ArXiv, Retrieved from: https://arxiv.org/abs/1409.6874v1, 22 pgs.

Walk et al., "Short-Message Communication and FIR System Identification using Huffman Sequences", arxiv.org, Cornell University Library, Feb. 1, 2017, XP080746219, Retrieved from: https://arxiv.org/abs/1702.00160.

Walk et al., "Short-Message Communication and FIR System Identification using Huffman Sequences", IEEE International Symposium on Information Theory, Jun. 2017, Aachen, Germany.

Wang et al., "Weighted Energy Detection for Noncoherent Ultra-Wideband Receiver Design", IEEE Transactions on Wireless Communications, vol. 10, No. 2, Feb. 2011.

Wunder et al., "5GNOW: Non-Orthogonal, Asynchronous Waveformsfor Future Mobile Applications", IEEE Communications Magazine, vol. 52, No. 2, Feb. 2014, pp. 97-105.

Wunder et al., "Sparse Signal Processing Concepts for Efficient 5G System Design", arXiv.org, Retrieved from: https://arxiv.org/abs/1411.0435, Nov. 3, 2014.

Xu et al., "A least-squares approach to blind channel identification", IEEE Transaction on Signal Processing, vol. 43, No. 12, 1995, pp. 2982-2993.

Yan et al., "Low Probability of Detection Communication: Opportunities and Challenges", arXiv, Retrieved from: https://arxiv.org/abs/1906.07895v1, Jun. 19, 2019, 7 pgs.

Zhang et al., "Extensions and sharpenings of Jordan's and Kober's inequalities", Journal of Inequalities in Pure and Applied Mathematics, vol. 7, No. 2, Art. 63, 2006.

Zhang et al., "Novel Blind Carrier Frequency Offset Estimation for OFDM System with Multiple Antennas", IEEE Transactions on Wireless Communications, vol. 9, No. 3, Mar. 11, 2010, pp. 881-885.

Zhang et al., "Pilot contamination elimination for large-scale multiple-antenna aided OFDM systems", IEEE Journal of Selected Topics in Signal Processing, vol. 8, No. 5,Oct. 2014, pp. 759-772.

Extended European Search Report for European Application No. 19743639.7, Search completed Aug. 31, 2021, dated Sep. 8, 2021, 8 Pgs.

International Preliminary Report on Patentability for International Application PCT/US2020/017289, Report dated Aug. 10, 2021, dated Aug. 19, 2021, 7 Pgs.

Walk et al., "Physical Layer Secure Communications over Wireless Channels via Common Zeros", 2018, IEEE International Symposium on Information Theory (ISIT), Vail, CO, 2018, pp. 191-195, doi: 10.1109/ISIT.2018.8437476.

\* cited by examiner

Algorithm 1 center-peak-back-step (CPBS)

Require: $|r|^2$, $\rho_0$, $K$, and $\hat{t}$

1: for $b = 1$ to $\lfloor K/2 \rfloor$ do
2:    if $|r_{\hat{t}-b}|^2 > \rho_0$ & $\sum_{n=1}^{b} |r_{\hat{t}-n}|^2 > \frac{b\rho_0}{1+\frac{\log b}{3}}$ then
3:       $\hat{\tau}_0 = \hat{t} - b$
4:    end if
5: end for
6: return $\hat{\tau}_0$

Fig. 6

Algorithm 2 CIR energy-detection (CIRED)

Require: $|\mathbf{r}|^2$, $\hat{\tau}_0$, $N_0$, $K$, $L$, and $p$

1: $E_r = \sum_{\ell=1}^{L} |r_{\hat{\tau}_0 + K + 1 + \ell}|^2 - LN_0$;
2: $E_{\text{eff}} = |r_{\hat{\tau}_0 + K + 1}|^2$; $L_{\text{eff}} = 1$; $\mu = p^{LN_0 / 2E_r}$;
3: while $E_{\text{eff}} < \mu \cdot E_r$ do
4: $\quad L_{\text{eff}} = L_{\text{eff}} + 1$;
5: $\quad E_{\text{eff}} = E_{\text{eff}} + |r_{\hat{\tau}_0 + K + L_{\text{eff}}}|^2$;
6: end while
7: return $L_{\text{eff}}$

*Fig. 8*

```
1  l=(n-k)/m;                    % Number of primitive ...
       polynomials for Gout
2  S=(n-1)/m;
3  B=k-m;
4
5  prim=primpoly(m,'all');
6  gout=1; gin=de2bi(prim(1),m+1);
7  for s=S-l:S-1
8      gout=gfconv(de2bi(prim(s)),gout,2);
9  end
10 if l==numel(prim)
11     gin=1;
12 end
13 g=gfconv(gin,gout,2);          % generator polynomial ...
       (Binary) for cyclic linear code
14 P=zeros(B,n-B);                % Parity Check part
15 for i=1:B
16     xi=zeros(1,n+1-i); xi(n+1-i)=1;
17     [~,si]=gfdeconv(xi,g,2);
18     P(B-i+1,1:numel(si))=si;
19 end
20 tG=[P eye(B)];                 % linear systematic generator ...
       matrix
21 tH=[eye(n-B) P'];              % linear systematic generator ...
       matrix
22 a=[gout, zeros(1,n-m+1-1)];    % constant affine shift
23 P=zeros(k,n-k);                % Parity Check part
24 for i=1:k
25     xi=zeros(1,n+1-i); xi(n+1-i)=1;
26     [~,si]=gfdeconv(xi,gout,2);
27     P(k-i+1,1:numel(si))=si;
28 end
29 tHout=[eye(n-k) P'];           % need for syndrom, error ...
       correction
30 Tsynd=syndtable(tHout);        % outer code syndrom table
```

Matlab-Code 1: Systematic Generator and Check Matrix

Fig. 16

SYSTEMS AND METHODS FOR COMMUNICATING BY MODULATING DATA ON ZEROS IN THE PRESENCE OF CHANNEL IMPAIRMENTS

CROSS-REFERENCE TO RELATED APPLICATIONS

The present invention is a continuation of U.S. patent application Ser. No. 17/013,525 entitled "Systems and Methods for Communicating by Modulating Data on Zeros in the Presence of Channel Impairments", filed Sep. 4, 2020, which is a continuation of U.S. patent application Ser. No. 16/785,279 entitled "Systems and Methods for Communicating by Modulating Data on Zeros in the Presence of Channel Impairments", filed Feb. 7, 2020 and issued on Oct. 13, 2020 as U.S. patent Ser. No. 10/804,982, which claims priority to U.S. Provisional Patent Application Ser. No. 62/802,578 entitled "Robust Transceiver Designs for Frequency and Time Offsets", filed Feb. 7, 2019, the disclosures of which are herein incorporated by reference in their entireties.

FIELD OF THE INVENTION

The disclosure relates generally to communication systems and more specifically to blind communication schemes that transmit over unknown wireless multipath channels.

BACKGROUND

The future generation of wireless networks faces a diversity of new challenges. Trends on the horizon—such as the emergence of the Internet of Things (IoT) and the tactile Internet—have radically changed thinking about how to scale wireless infrastructure. Among the main challenges new emerging technologies have to cope with is the support of a massive number (billions) of devices ranging from powerful smartphones and tablet computers to small and low-cost sensor nodes. These devices come with diverse and even contradicting types of traffic including high speed cellular links, massive amounts of machine-to-machine (M2M) connections, and wireless links which carrying data in short-packets. Although intensively discussed in the research community, the most fundamental question of how we will communicate in the near future under such diverse requirements remains largely unresolved.

A key problem of supporting sporadic and short-message traffic types is how to acquire, communicate, and process channel information. Conventional channel estimation procedures typically require a substantial amount of resources and overhead. This overhead can dominate the intended information exchange when the message is short and the traffic sporadic. For example, once a node wakes up in a sporadic manner to deliver a message it has first to indicate its presence to the network. Secondly, training symbols (pilots) are typically used to provide sufficient information at the receiver for estimating link parameters such as the channel coefficients. Finally, after exchanging a certain amount of control information, the device transmits its desired information message on pre-assigned resources. In current systems these steps are usually performed sequentially in separate communication phases yielding a tremendous overhead once the information message is sufficiently short and the nodes wake up in an unpredictable way. Therefore, a redesign and rethinking of several well-established system concepts and dimensioning of communication layers will likely be necessary to support such traffic types in an efficient manner. Noncoherent and blind strategies, provide a potential way out of this dilemma. Classical approaches like blind equalization have been investigated in the engineering literature, but new noncoherent modulation ideas which explicitly account for the short-message and sporadic type of data will likely be required.

In many wireless communication scenarios the transmitted signals are affected by multipath propagation and the channel will therefore be frequency-selective if the channel delay spread exceeds the sampling period. Additionally, in mobile and time-varying scenarios one encounters also time-selective fast fading. In both cases channel parameters typically have a random flavor and potentially cause various kinds of interference. From a signal processing perspective it is, therefore, desirable to take care of possible signal distortions, at the receiver and potentially also at the transmitter.

A known approach to deal with multipath channels is to modulate data on multiple parallel waveforms, which are well-suited for the particular channel conditions. A simple approach that can be utilized for frequency-selective multipath channels is orthogonal frequency division multiplexing (OFDM). When the maximal channel delay spread is known, inter-symbol-interference (ISI) can be avoided by a suitable guard interval. Orthogonality of the subcarriers can be achieved by a cyclic prefix preventing inter-carrier-interference. On the other hand, from an information-theoretic perspective, random channel parameters are helpful from a diversity view point. Spreading data over subcarriers can exploit diversity in a frequency-selective fading channel. But to coherently demodulate the data symbols at the receiver, the channel impulse response (CIR) should be known at least at the receiver. To gain knowledge of the CIR, training data (pilots) are typically added to the information baseband samples, leading to a substantial overhead when the number of samples per signal is in the order of the channel taps. If the number of samples is even less than the number of channel taps, it can be mathematically impossible to accurately estimate from any pilot data the channel (assuming full support). Hence, one is either forced to increase the signal length by adding more pilots or assume some side-information on the channel. Furthermore, the pilot density has to be adapted to the mobility and, in particular, OFDM is very sensitive to time-varying distortions due to Doppler shift and oscillator instabilities. Dense CIR updates are often required, which can result in complex transceiver designs.

Due to ubiquitous impairments between transmitter and receiver clocks a carrier frequency offset (CFO) is likely to be present after a down conversion to the baseband. Doppler shifts due to relative velocity can also cause additional frequency dispersion which can be approximated in first order by a CFO. This is a known weakness in many multi-carrier modulation schemes, such as OFDM, and various approaches have been developed to estimate or eliminate the CFO effect. A common approach for OFDM systems is to learn the CFO in a training phase or from blind estimation algorithms, such as MUSIC or ESPRIT. Furthermore, due to the unknown distance and asynchronous transmission, a timing offset (TO) of the received symbol typically has to be determined as well, which will otherwise destroy the orthogonality of the OFDM symbols. By "sandwiching" the data symbol between training symbols a timing and frequency offset can be estimated. By using antenna arrays at the receiver, antenna diversity of a single-input-multiple output (SIMO) system can be exploited to improve the performance.

OFDM is typically used in long packets (frames), consisting of many successive symbols resulting in long signal lengths. In a sporadic communication, only one packet is transmitted and the next packet may follow at an unknown time later. In a random access channel, a different user may transmit the next packet from a different location. Such a packet experiences an independent channel realization. Hence, the receiver can barely use any channel information learned from the past. To reduce overhead and power consumption, again low-latency and short-packet durations are favorable.

A communication system that supports sporadic packet communication at ultra low latency can be useful in a number of applications including (but not limited to) critical control applications, like commands in wireless for high performance (HP), ad hoc signaling protocols, secret key authentication, or initiation, synchronization and channel probing packets to prepare for longer or future transmission phases. At the same time, ultra reliability is required for such low latency communications (URLLC), especially if dealing with industrial wireless scenarios where the packets contain critical control data. The IEEE 802.11 standard for WirelessHP specifies a target packet error probability of $10^{-9}$ at scheduling units (SU) below 1 µs for power system automation and power electronic control. Here, the SU is the actual transmission time between transmitter and receiver. Furthermore, the next generation of mobile wireless networks aims for large bandwidths with carrier frequencies beyond 30 GHz, in the so called mmWave band, such that the sampling period is in the order of nano seconds. Hence, even at moderate mobility, the wireless channel remains approximately time-invariant only for a short duration, encouraging shorter symbol lengths. On the other hand, wideband channels resolve many multipaths due to the large bandwidth, which makes equalizing in the time-domain very challenging and is commonly simplified by using OFDM instead. But this can require long signal lengths, due to additional pilots needed to learn the channel. This may not be feasible if the transmission time or scheduling unit requirement is too short. Also, the maximal CIR length needs to be known at the transmitter and if underestimated might lead to a serious performance loss. Considering indoor channels at 60 GHz, a delay spread of up to 30 ns can still be present. Considering a bandwidth of 1 GHz results in a CIR length of 30 and a signal length of 100-1000 to meet the SU requirement. Hence, exploiting multiple OFDM symbols becomes more and more challenging if the receive duration approaches the order of the channel delay spread. Therefore, one-shot symbol transmissions can become necessary to push the latency on the physical-layer to its physical limits.

Another issue in transmitting at high frequencies can be attenuation, which can be overcome by exploiting beamforming with massive antenna arrays. For massive or mobile users, this again increases the complexity and energy consumption for estimating and tracking the huge amount of channel parameters. Furthermore, a bottleneck in mmWave MIMO systems can be the blockage of line-of-sight connections which require wider or multiple beams, resulting in a significant reduction of the receive power.

SUMMARY OF THE INVENTION

Systems and methods in accordance with many embodiments of the invention utilize timing-offset (TO) and carrier frequency offset (CFO) estimation in a BMOCZ scheme to communicate over unknown multipath channels including (but not limited to) wideband frequency-selective fading channels. In several embodiments, the CFO robustness is realized by a cyclically permutable code (CPC), which can enable a receiver to identify the CFO. In a number of embodiments, an oversampled DiZeT decoder is utilized within the receiver that is capable of estimating the CFO. In certain embodiments, CPC codes are utilized that are constructed with cyclic BCH codes, which can provide the capability to correct additional bit errors and can enhance the performance of the BMOCZ scheme for moderate SNRs.

Due to the low-latency of BMOCZ the CFO and TO estimation can be performed from as few as one single BMOCZ symbol. This blind scheme can be ideal for control-channel applications, where a limited amount of critical and control data is exchanged while at the same time, channel and impairments information needs to be communicated and estimated. Communication systems that employ BMOCZ coded with a CPC in accordance with many embodiments of the invention can enable low-latency and ultra-reliable short-packet communications over unknown wideband channels.

One embodiment of the communication system includes a transmitter having: an encoder configured to receive a plurality of information bits and output a plurality of encoded bits in accordance with a cycling register code (CRC); a modulator configured to modulate the plurality of encoded bits to obtain a discrete-time baseband signal, where the plurality of encoded bits are encoded in the zeros of the z-transform of the discrete-time baseband signal; and a signal generator configured to generate a continuous-time transmitted signal based upon the discrete-time baseband signal. In addition, the communication system includes a receiver, having: a demodulator configured to down convert and sample a received continuous-time signal at a given sampling rate to obtain a received discrete-time baseband signal, where the received discrete-time baseband signal includes at least one of a timing offset (TO) and a carrier frequency offset (CFO); and a decoder configured to decode a plurality of bits of information from the received discrete-time baseband signal. Furthermore, the decoder decodes the plurality of bits of information by: estimating a TO for the received discrete-time baseband signal to identify a received symbol; determining a plurality of zeros of a z-transform of the received symbol; identifying zeros from the plurality of zeros that encode a plurality of received bits; and decoding a plurality of information bits based upon the plurality of received bits using the CRC.

In a further embodiment, the receiver receives the continuous-time transmitted signal over a multipath channel.

In another embodiment, the modulator is configured to modulate the plurality of encoded bits so that the z-transform of the discrete-time baseband signal comprises a zero for each of a plurality of encoded bits.

In a still further embodiment, the modulator is configured to modulate the plurality of encoded bits so that each zero in the z-transform of the discrete-time baseband signal is limited to being one of a set of conjugate-reciprocal pairs of zeros.

In still another embodiment, each conjugate reciprocal pair of zeros in the set of conjugate-reciprocal pairs of zeros comprises: an outer zero having a first radius that is greater than one; and an inner zero having a radius that is the reciprocal of the first radius. In addition, the inner and outer zero have phases that are the same phase, the radii of the outer zeros in each pair of zeros in the set of conjugate-reciprocal pairs of zeros are the same, and the phases of the outer zeros in each pair of zeros in the set of conjugate-reciprocal pairs of zeros are evenly spaced over one complete revolution.

In a yet further embodiment, the cycling register code is a cyclically permutable code (CPC).

In yet another embodiment, the CPC is extracted from a Bose Chaudhuri Hocquenghem (BCH) code.

In a further additional embodiment, the CPC is extracted form a primitive BCH code.

In another additional embodiment, the CPC has a code length that is a Mersenne prime.

In a further embodiment again, the CPC has a code length selected from the group consisting of 3, 7, 31, and 127.

In another embodiment again, the CRC is generated by an inner code and an outer code which are combined in a non-linear fashion.

In a still yet further embodiment, the outer code is a cycling register code having a lower code rate than the inner code.

In still yet another embodiment, the outer code is a cyclically permutable code (CPC).

In a still further additional embodiment, the CRC is an affine CPC (ACPC) code.

In still another additional embodiment, the ACPC is characterized by being attainable using a cyclic inner code having codewords of an inner codeword length, which is affine translated by a given binary word of the inner codeword length, and then further encoded by a cyclic outer code.

In a still further embodiment again, the decoder is configured to estimate the timing offset by measuring energy over an expected symbol length with a sliding window in the sampled signal.

In still another embodiment again, the decoder is configured to measure energy over an expected symbol length by convolving samples with a universal Huffman sequence of the expected symbol length comprising two impulses at the beginning and the end of the expected symbol length.

In a yet further additional embodiment, the decoder is configured to estimate the TO by identifying a set of three energy peaks that yield a maximum energy sum over an expected symbol length.

In yet another additional embodiment, the demodulator is configured to oversample the received continuous-time signal, and the decoder is configured to identify zeros from the plurality of zeros that encode a plurality of received bits by identifying a fractional rotation resulting from the carrier frequency offset.

In a yet further embodiment again, the decoder is configured to determine a most likely set of zeros for the z-transform of the discrete-time baseband signal used to generate the transmitted signal based upon the received symbol.

In yet another embodiment again, the decoder is configured to determine the plurality of received bits by performing a weighted comparison of samples of the z-transform of the received symbol with each zero in a set of zeros.

In a further additional embodiment again, each zero in the z-transform of the discrete-time baseband signal used to generate the transmitted signal is limited to being one of a set of conjugate-reciprocal pairs of zeros.

In another additional embodiment again, the receiver comprises a plurality of receive antennas and the decoder determines the plurality of information bits by combining values derived from the samples of a plurality of continuous-time signals received by the plurality of receive antennas to perform decoding.

A transmitter in accordance with one embodiment of the invention includes: an encoder configured to receive a plurality of information bits and output a plurality of encoded bits in accordance with a cycling register code (CRC); a modulator configured to modulate the plurality of encoded bits to obtain a discrete-time baseband signal, where the plurality of encoded bits are encoded in the zeros of the z-transform of the discrete-time baseband signal; and a signal generator configured to generate a continuous-time transmitted signal based upon the discrete-time baseband signal.

In a further embodiment, the continuous-time transmitted signal comprises a carrier frequency modulated based upon the discrete-time baseband signal.

A receiver in accordance with one embodiment of the invention includes a demodulator configured to down convert, and sample a received continuous-time signal to obtain a received discrete-time baseband signal and over sample the received discrete-time signal by zero padding, where the received discrete-time baseband signal includes at least one of a timing offset (TO) and a carrier frequency offset (CFO); and a decoder configured to decode a plurality of bits of information from the received discrete-time baseband signal by: estimating a TO for the received discrete-time baseband signal to identify a received symbol; determining a plurality of zeros of a z-transform of the received symbol; identifying zeros from the plurality of zeros that encode a plurality of received bits by identifying and correcting a fractional rotation in the plurality of zeros resulting from the CFO; and decoding a plurality of information bits based upon the plurality of received bits using a cycling register code (CRC).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 shows an iterative back stepping algorithm for estimating timing offset in accordance with an embodiment of the invention.

FIG. 8 shows an algorithm for estimating channel length based upon channel energy in accordance with an embodiment of the invention.

FIG. 16 shows MATLAB code for creating the generator and check matrices of an ACPC-(n, k-m) code, as well as the binary codeword for the affine shift in accordance with an embodiment of the invention.

DETAILED DESCRIPTION

Figure 1:
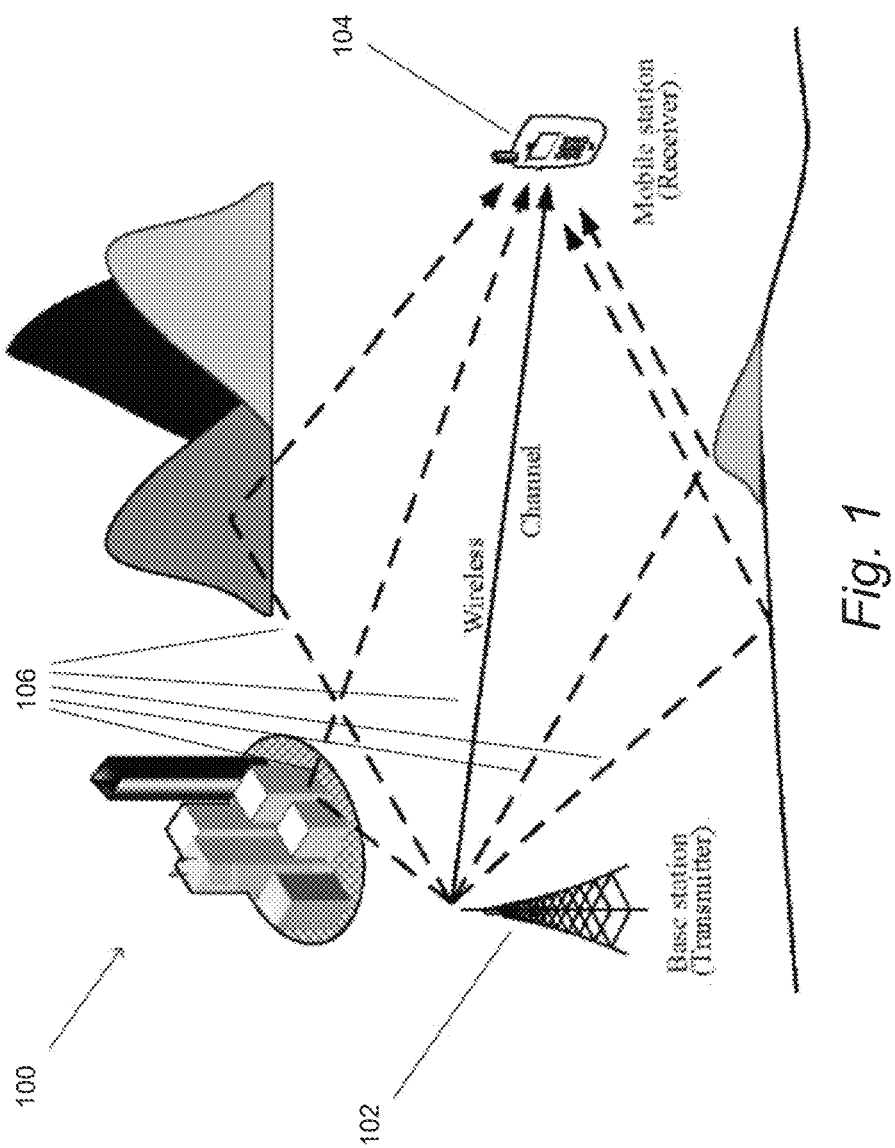
FIG. 1 conceptually illustrates multipath propagation of transmitted signals in a wireless channel.

Turning now to the drawings, communication systems and methods in accordance with various embodiments of the invention utilize a blind (noncoherent) communication scheme, called modulation on conjugate-reciprocal zeros (MOCZ), which can reliably transmit sporadic short-packets of fixed size over channels including (but not limited to) unknown wireless multipath channels. In many embodiments, communication systems utilize MOCZ schemes to transmit reliable and robust data with as few as one symbol in the presence of timing and/or frequency offsets. As is discussed further below, a carrier frequency offset (CFO) can result in an unknown rotation of all zeros of a received signal's z-transform. Therefore, in several embodiments, a binary MOCZ scheme (BMOCZ) is utilized in which the modulated binary data is encoded using a cyclically permutable code (CPC), which can cause the BMOCZ symbol to be invariant with respect to any cyclic shift resulting from a CFO. In a number of embodiments, the communication systems can utilize techniques similar to those described herein to achieve high spectral efficiency and/or low-latency.

In several embodiments, a transmitter modulates the information of a packet on the zeros of a transmitted discrete-time baseband signal's z-transform. The discrete-time baseband signal can be called a MOCZ symbol, which is a finite length sequence of complex-valued coefficients. These coefficients can then modulate a continuous-time pulse shape at a sample period of T=1/W, where W is the bandwidth, to generate a continuous-time baseband waveform. Since the MOCZ symbols (sequences) are neither orthogonal in the time nor frequency domain, the MOCZ design can be seen as a non-orthogonal multiplexing scheme. After up-converting to the desired carrier frequency by the transmitter, the transmitted passband signal can propagate in space such that, due to reflections, diffractions, and/or scattering, different, delays of the attenuated signal can interfere at the receiver. Hence, multipath propagation can cause a time-dispersion which can result in a frequency-selective fading channel. Furthermore, a CFO is likely to be present after a down conversion to baseband at the receiver.

Unlike OFDM, which is typically used in long frames, MOCZ can be utilized with shorter transmissions. In a bursty signaling scheme, timing and carrier frequency offsets may need to be addressed from only one received symbol or a small number of received symbols. In MOCZ schemes in accordance with a number of embodiments of the invention, communication is scheduled and timed on a MAC layer by a certain bus, running with a known bus clock-rate. Therefore, timing-offsets of the symbols can be assumed as fractions of the bus clock-rate. Accordingly, MOCZ receivers in accordance with many embodiments of the invention can be designed to be robust to these impairments.

In a communication system that employs MOCZ, a CFO is likely to result in an unknown common rotation of all received zeros. Since the angular zero spacing in a BMOCZ symbol of length K+1 is given by a base angle of 2π/K, a fractional rotation can be easily obtained at the receiver by an oversampling during the post-processing to identify the most likely transmitted zeros (zero-pattern).

Rotations, which are integer multiples of the base angle, can correspond to cyclic shifts of the binary message word. By using a CPC for the binary message, which can be extracted from cyclic codes, such as (but not limited to) Bose Chaudhuri Hocquenghen (BCH) code, a BMOCZ symbol can become invariant against cyclic shifts and hence against, a CFO present with a communication system. In several embodiments, use of a CPC to encode a binary message can enable the operation of a communication system in a manner that does not rely upon symbol transmissions for estimation of a CFO, which can reduce overhead, latency, and complexity. In a number of embodiments, the communication system is able to provide a CFO estimation as part of the decoding process of a single BMOCZ symbol. In a number of embodiments, the receiver is able to estimate the cyclic shift that has been introduced by the CFO based upon the mapping of the zeros of the z-transform of the received symbol to bits and the CPC used to encode the transmitted message. Furthermore, the error correction capabilities of the CPC can also improve the BER and moreover the block error-me (BLER) performance of the communication system tremendously.

By measuring the energy of the expected symbol length with a sliding window in the received signal, a receiver in accordance with various embodiments of the invention can identify arbitrary TOs. The robustness of the TO estimation can be demonstrated analytically, which reveals another strong property of communication systems that employ MOCZ schemes. Once the TO is determined, the symbol can be decoded and the CPC utilized to correct for any CFO.

In many embodiments, communication systems employ multiple receive antennas and achieve robustness to CFO and TO using a CPC for error correction. By simulating BER over the received SNR for various average power delay profiles, with constant and exponential decay as well as random sparsity constraints, performance of communication systems in accordance with various embodiments of the invention in different indoor and outdoor scenarios can be demonstrated.

Communication systems, transmitters, and receivers that can be utilized to transmit data encoded using a CPC by MOCZ in accordance with various embodiments of the invention are discussed further below.

Notation

In the discussion that follows, small letters are used for complex numbers in $\mathbb{C}$. Capital Latin letters denote natural numbers $\mathbb{N}$ and refer to fixed dimensions, where small letters are used as indices. Boldface small letters denote row vectors and capitalized letters refer to matrices. Upright capital letters denote complex-valued polynomials in $\mathbb{C}[z]$. The first N natural numbers in $\mathbb{N}$ are denoted as [N]: $\{0, 1, \ldots, N-1\}$. For $K \in \mathbb{N}$, $K+[N]=\{K, K+1, \ldots K+N-1\}$ is denoted by the K-shift of the set [N]. The Kronecker-delta symbol is given by $\delta_{nm}$ and is 1 if n=m and 0 otherwise. For a complex number x=a+jb, given by its real part Re(x)=a$\in \mathbb{R}$ and imaginary part Im(x)=b$\in \mathbb{R}$ with imaginary unit j=$\sqrt{-1}$, its complex-conjugation is given by $\overline{x}$=a–jb and its absolute value by $$|x| = \sqrt{x\overline{x}}.$$

For a vector $x \in \mathbb{C}^N$ its complex-conjugated time-reversal or conjugate-reciprocal is denoted by $\overline{x^-}$, given as $\overline{x_k}$. The discussion also uses $A^* = \overline{A}^T$ for the complex-conjugated transpose of the matrix A. The N×N identity is written as $I_N$ and a N×M matrix with all elements zero is written as $O_{N,M}$. $D_x$ refers to the diagonal matrix generated by $x \in \mathbb{C}^N$. The N×N unitary Fourier matrix $F=F_N$ is given entry-wise by $f_{l,k}=e^{-j2\pi lk/N}/\sqrt{N}$ for l, k$\in$[N]. $T \in \mathbb{R}^{N \times M}$ denoted the elementary Toeplitz matrix given element-wise as $\delta_{n-lm}$. The all one and all zero vectors in dimension N will be denoted by $1_N$ and $0_N$, respectively. The Euclidean basis vectors in $\mathbb{C}^N$ are given by $\{e_1, \ldots, e_N\}$ elementwise as $(e_i)_j=\delta_{i,j}$ for i, j$\in$1+[N]. The $\ell_p$-norm of a vector $x=(x_0, \ldots, x_{N-1}) \in \mathbb{C}^N$ is given by $\|x\|_p=(\sum_{k=0}^{N-1}|x_k|^p)^{1/p}$ for p≥1. If p=∞, then $\|x\|_\infty=\max_k|x_k|$ and for p=2 $\|x\|_2=\|x\|$. Finally, the expectation of a random variable x is denoted by $\mathbb{E}[x]$.

System Model

Systems and methods in accordance with many embodiments of the invention involve transmission of data of an unknown multipath channel. Multipath propagation of transmitted data is conceptually illustrated in FIG. 1. In the illustrated embodiment, the communication system 100 includes a base station 102 that is acting as a broadcasting transmitter and an arbitrary mobile station 104 that is acting as a receiver. In the illustrated embodiment, the signal transmitted by the base station 102 can be received by the mobile station 104 via six different 106 paths of propagation. Therefore, the signal received by mobile station 104 is a superposition of the signals received via the different paths subject to the various delays experienced by the signals. The channel also introduces noise. In the illustrated embodiment, the message data is encoded using a CPC to provide robustness to CFO and/or TO. As is discussed further below, CPCs are just one example of a class of appropriate code and the various embodiments described herein should be understood as not being limited to a single class of code. Instead, systems and methods in accordance with various embodiments of the invention can utilize any code that enables a receiver to detect and/or correct a cyclic rotation (permutation) of the transmitted message bits as appropriate to the requirements of specific applications.

Figure 2:
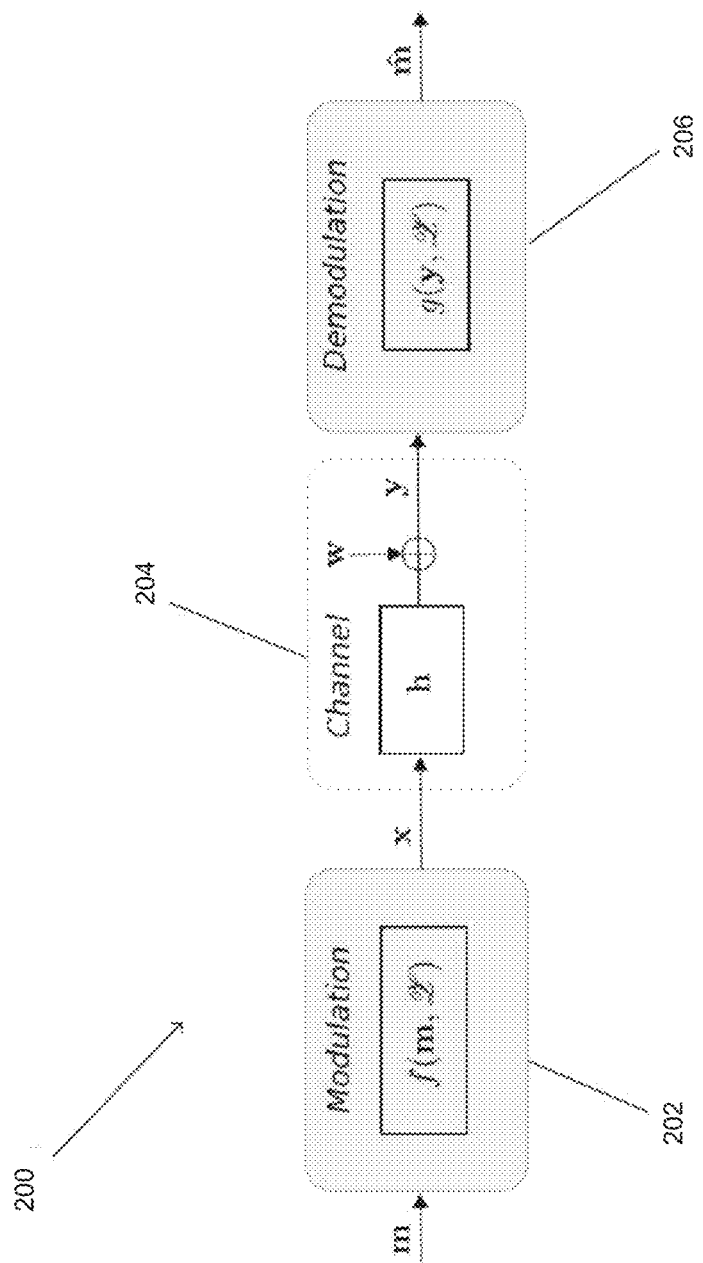
FIG. 2 conceptually illustrates a transmitter and receiver that utilize a binary MOCZ scheme over an unknown multipath channel distorted by additive noise implemented in accordance with an embodiment of the invention.

A transmitter and receiver that utilize a binary MOCZ scheme over an unknown multipath channel implemented in accordance with an embodiment of the invention are conceptually illustrated in FIG. 2. The communication system 200 includes a modulator within the transmitter 202 that performs a modulation operation f to transmit data over a multipath channel 204 and a decoder 206 within a receiver that performs a demodulation/decoder operation g. As discussed below, both the modulation operation f and the decoder operation g rely on at least on shared zero-codebook $\mathscr{Z}$. It is in principle possible that a receiver can blindly identify the used zero-codebook taken from a predefined set of zero-codebooks to allow for example multiple access schemes. As is discussed below, the transmitter and receiver described herein are practical and can be implemented using logic devices including (but not limited to) field programmable gate arrays, digital signal processors, and or any of a variety of conventional software defined radio platforms.

The binary message sequence $m_k \in \{0, 1\}$ can be chunked at the transmitter in blocks of length K. As is discussed further below, these blocks can then be encoded using a code that is robust to cyclic permutations. In several embodiments, the encoding can involve multiple codes. In certain embodiments, a combination of an inner code an outer code is utilized, where the inner code is a cyclic code which is affine translated and an outer code which is a cyclic code that provides error correction capabilities and robustness against cyclic shifts. As can readily be appreciated the specific code and/or combination of codes that are utilizes within a transmitter are largely dependent upon the requirements of specific applications in accordance with various embodiments of the invention.

For BMOCZ, the modulator f encodes the block m to a normalized complex-valued symbol (sequence) $x=(x_0, \ldots, x_{K+1})^T \in \mathbb{C}^{K+1+1}$ by using the zero-codebook $\mathscr{Z}$ of cardinality $2^K$. In many embodiments, when the block size K is small, the discrete-time BMOCZ symbols can be pre-generated using the methods described below for creating a codebook, and is selected using a lookup mechanism such as (but not limited to) a lookup table. The BMOCZ symbol x is typically modulated onto a carrier frequency $f_c$ with a pulse generator running at a sampling clock $T=1/W$ to transmit a real-valued passband signal of bandwidth W to the receiver over an unknown time-invariant channel with a maximum delay spread of $T_d=(L-1)T$ which resolves L equally spaced multi-paths (delays). After a down-converting and sampling to the discrete-time baseband, the receiver observes the channel output y under an unknown additive noise vector w. As noted above, the down conversion can also introduce a CFO and/or a TO. The demodulator/decoder 206 can obtain from the received signal an estimated block codeword m̂ by the knowledge of the zero-codebook $\mathscr{Z}$. As is discussed further below, use of a CPC in the encoding of the transmitted data enables the receiver to decode the transmitted data despite the presence of a CFO and/or a TO.

Although a specific binary MOCZ scheme is described above with reference to FIG. 2, as is discussed below, a variety of MOCZ schemes can be implemented as appropriate to the requirements of a given application in accordance with various embodiments of the invention including (but not limited to) communication systems that employ M-ary MOZ schemes, MOCZ schemes, multiple receive antennas and/or outer codes to provide additional error correction capabilities enabling recovery of message bits in the face of received bit errors. In order to appreciate these different variants, a more complex and generalized model of a communication system that utilizes a MOCZ scheme is described below.

System Model and Requirements

Communication systems and methods in accordance with many embodiments of the system utilize a blind and asynchronous transmission of a short single MOCZ symbol at a designated bandwidth W. In this "one-shot" communication, it can be assumed that no synchronization and no packet scheduling occurs between the transmitter and receiver. Such extreme sporadic, asynchronous, and ultra short-packet transmissions are often employed in applications that include (but are not limited to): critical control applications, exchange of channel state information (CSI), signaling protocols, secret keys, authentication, commands in wireless industry applications, or initiation, and synchronization and channel probing packets to prepare for longer or future transmission phases.

By choosing the carrier frequency, transmit sequence length, and bandwidth accordingly, a receive duration in the order of the channel delay spread can be obtained, which can reduce latency at the receiver (potentially to the lowest latency possible). Since the next generation of mobile wireless networks aims for large bandwidths with carrier frequencies beyond 10 Ghz, in the so called mm Wave band, the transmitted signal duration of a signal transmitted in accordance with an embodiment of the invention can be in the order of nano seconds. Hence, even at moderate mobility, the wireless channel in an indoor or outdoor scenario can be considered as approximately time-invariant over such a short time duration. On the other hand, wideband channels can be highly frequency selective, which can be due to the superposition of different delayed versions (echos) of the transmitted signal at the receiver. This can make performing equalization in the time-domain very challenging and is commonly simplified by using an OFDM scheme. But conventional OFDM typically requires an additional cyclic prefix to convert the frequency-selective channel to parallel scalar channels and, in coherent mode, it often requires additional pilots (training) to learn the channel coefficients. As can readily be appreciated, this can increase latency for short messages dramatically.

For a communication in the mmWave band, massive antenna arrays can be exploited to overcome attenuation. Use of multiple receive antennas can increase complexity and energy consumption in estimating channel parameters and can become a bottleneck in mmWave MIMO systems, especially for mobile scenarios. However, in a sporadic communication one or a small number of symbols are transmitted and additional symbols may follow at an unknown later time. In a random access channel (RACH), a different, user may transmit the next symbol from a different location, which will therefore experience an independent channel realization. Hence, the receiver can barely use any channel information learned from past communications. OFDM systems typically approach this by transmitting many successive OFDM symbols as a long frame, to estimate the channel impairments, which can cause considerable overhead and latency if only a few data-bits need to be communicated. Furthermore, to achieve orthogonal subcarriers in OFDM, the cyclic prefix typically has to be at least as long as the channel impulse response (CIR) length, resulting in signal lengths at least twice the CIR length during which the channel also needs to be static. Using OFDM signal lengths much longer than the coherence time might not be feasible for fast time-varying block-fading channels. Furthermore, the maximal CIR length typically needs to be known at the transmitter and if underestimated can lead to a serious performance loss. This is in high contrast to communication systems in accordance with various embodiments of the invention that employ a MOCZ scheme, where the signal length can be chosen for a single MOCZ symbol independently from the CIR length. As is discussed further below, communication systems in accordance with many embodiments of the invention encode transmitted data using CPCs to address the ubiquitous impairments of MOCZ schemes under such ad-hoc communication assumptions for communications involving signal lengths in the order of the CIR length.

After up-converting the MOCZ symbol, which is a discrete-time complex-valued baseband signal $x=(x_0, x_1, \ldots, x_K) \in \mathbb{C}^{K+1}$ of two-sided bandwidth W, to the desired carrier frequency $f_c$, the transmitted passband signal will propagate in space. Regardless of directional or omnidirectional antennas, the signal can be reflected and diffracted at point-scatters, which can result in different delays of the attenuated signal and interfere at the receiver if the maximal delay spread $T_d$ of the channel is larger than the sample period $T=1/W$. Hence, the multipath propagation causes time dispersion resulting in a frequency-selective fading channel. Due to ubiquitous impairments between transmitter and receiver clocks an unknown frequency offset $\Delta f$ will be present after the down-conversion to the received continuous-time baseband signal $$\tilde{r}(t) = r(t) e^{j2\pi t \Delta f}. \quad (1)$$

A phase shift $\phi_0$ can also be present after down-conversion, which can yield a received continuous-time baseband signal $$\tilde{r}(t) = r(t) e^{j2\pi t \Delta f + j\phi_0}, \quad (2)$$

By sampling $\tilde{r}_n = \tilde{r}(nT)$ at the sample period T, the received discrete-time baseband signal can be represented by a tapped delay line (TDL) model. Here the channel action is given as the convolution of the MOCZ symbol x with a finite impulse response $\{h_\ell\}$, where the $\ell$th complex-valued channel tap $h_\ell$ describes the $\ell$th averaged path over the bin, [$\ell T$, ($\ell+1)T$), which can be modelled by a circularly symmetric Gaussian random variable as $$h_l \in \begin{cases} \mathcal{CN}(0, s_\ell p^\ell), & l \in [L] \\ 0, & \text{else} \end{cases} \quad (3)$$

The average power delay profile (PDP) of the channel can be sparse and exponentially decaying, where $s_\ell \in \{0, 1\}$ defines the sparsity pattern of $S = |\text{supp}(h)| = \sum_{\ell=0}^{L-1} s_\ell = \|s\|_1$ non-zero coefficients. To obtain equal average transmit and average receive power the overall channel gain can be eliminated from the analysis by normalizing the CIR realization $h = (h_0, \ldots, h_{L-1})$ by its average energy $\Sigma_{i=0}^{L-1} s_i p^l$ (for a given sparsity pattern), such that $\mathbb{E}[\|h\|^2] = 1$. The convolution output can then be additively distorted by Gaussian noise $u_n' \in \mathcal{CN}(0, N_0)$ of zero mean and variance (average power density) $N_0$ for $n \in \mathbb{N}$ as $$\tilde{r}_n = e^{jn\phi + j\phi_0}\left(\sum_{k=0}^{K} x_k h_{n-\tau_0-k} + w_n\right) = \quad (4)$$

$$\sum_{k=0}^{K} e^{jk\phi} x_k e^{j(n-k)\phi + j\phi_0} h_{n-\tau_0-k} + \tilde{w}_n = \sum_{k=0}^{K} \tilde{x}_k \tilde{h}_{n-\tau_0-k} + \tilde{w}_n.$$

Here $\phi = 2\pi \Delta f/W \mod 2\pi \in [0, 2\pi)$ denotes the carrier frequency offset (CFO) and $\tau_0 \in \mathbb{N}$ the timing offset (TO), which marks the delay of the first symbol coefficient $x_0$ via the first channel path $h_0$. The symbol $\tilde{x} = xM_\phi \in \mathbb{C}^{K+1}$ in (4) has phase-shifted coefficients $\tilde{x}_k = e^{jk\phi} x_k$ as well as the channel $$\tilde{h}_\ell = e^{j(l+\tau_0)\phi + j\phi_0} h_l,$$

which will be also affected by a global phase-shift $\tau_0\phi + \phi_0$. Since the channel taps are circularly symmetric Gaussian, their phases are uniformly distributed, and shifts will not change this distribution. By the same argument, the noise distribution of $u_n'$ is not alternated by the phase-shifts.

Instead of modulating the information of a message $m = (m_1, \ldots, m_K) \in [M]^K$ on time or frequency coefficients, communication systems and methods in accordance with many embodiments of the invention can employ a M-ary MOCZ. A MOCZ signal's z-transform is a polynomial of degree K that is determined by exactly K complex-valued zeros $\alpha_k^{(m_k)}$ and a factor $x_K$ as $$X(z) = \sum_{k=0}^{K} x_k z^k = x_K \prod_{k=1}^{K}\left(z - \alpha_k^{(m_k)}\right). \quad (5)$$

In several embodiments, the MOCZ encoder maps each message m of length K to the zero-pattern (zero-constellation) $\alpha(m) = (\alpha_1^{(m_1)}, \ldots, \alpha_K^{(m_K)}) \in \mathscr{Z}^K = \mathscr{Z}_1 \times \ldots \times \mathscr{Z}_K \subset \mathbb{C}^K$ which defines iteratively $$\forall q = 2, \ldots, K: x_q = (0, x_{q-1}) - (\alpha_q^{(m_q)} x_{q-1}, 0) \text{ and } x_1 = (-\alpha_1^{(m_1)}, 1) \quad (6)$$

the normalized MOCZ symbol (constellation) after the last iteration step $x = x_K/\|x_K\| \in \mathbb{C}^{K+1}$. Since the convolution with the CIR in (4) for the noise-free case (no CFO, no TO) is given as a polynomial product $Y(z) = X(z)H(z)$, the transmitted zeros will not be affected by any CIR realization.

Figure 3:
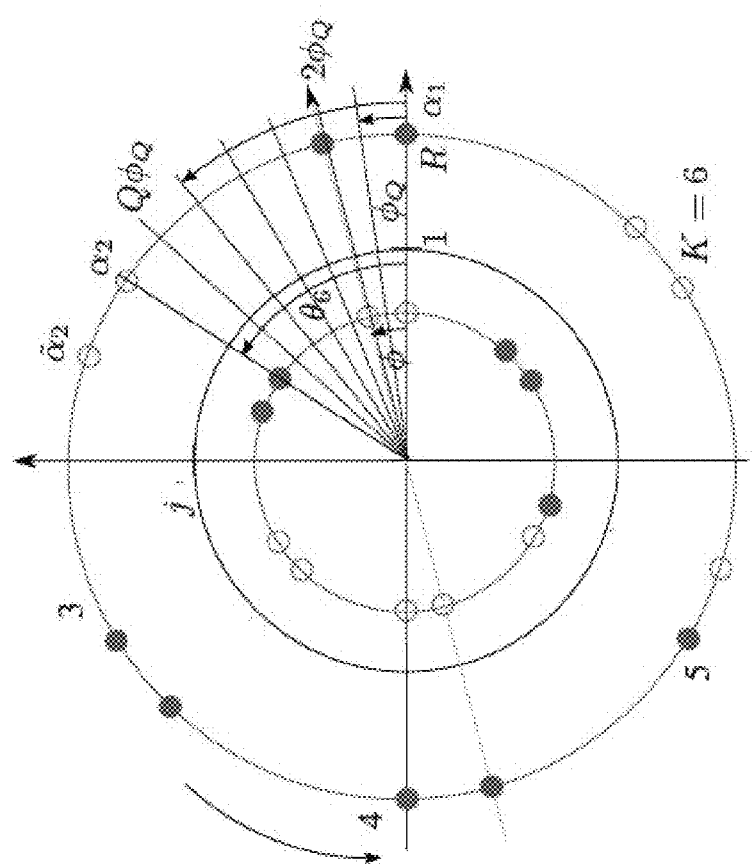
FIG. 3 conceptually illustrates carrier frequency-offset (CFO) estimation via oversampling the DiZeT decoder for K=6 data zeros and without channel zeros by a factor of Q=K=6 in accordance with an embodiment of the invention. Blue circles denote the codebook $\mathscr{Z}$ (6), solid blue circles the transmitted zeros $\alpha_k$ and red the received rotated zeros $\tilde{\alpha}_k$. The conjugate-reciprocal zero pairs are pairwise separated by the basis angle $\theta_6$.

Moreover, the added random channel zeros will not match any zero in $\mathscr{Z}^K$ with probability one, such that the transmitted zero-pattern can be blind (noncoherent) identified at the receiver. To obtain noise robustness, communication systems in accordance with many embodiments of the invention utilize a Binary MOCZ (BMOCZ) constellation, where each symbol defines the coefficients of a polynomial of degree K given by the zeros (roots)

$$\alpha_k \in \mathscr{Z}_k = \left\{ R^{2m_k - 1} e^{j2\pi\frac{k-1}{K}} \mid m_k \in \mathbb{F}_2 \right\},$$

which are uniformly placed on a circle of radius R or $R^{-1}$, selected by the message bits $m_k$, see FIG. 3 for K=6. The filled blue circles denote one possible zero constellation of a BMOCZ signal. The basis angle, separating the conjugate-reciprocal zeros pairs, is given by $\theta_K = 2\pi/K$. This constellation set can be given by all normalized Huffman sequences $\mathscr{C}_\eta^K = \{x \in \mathbb{C}^{K+1} | a(K, \eta) = x * \overline{x^-}, x_0 > 0\}$, i.e., by all $x \in \mathbb{C}^{K+1}$ with positive first coefficient and "impulsive-like" autocorrelation $$a = a(K, \eta) = \overline{x^-} = (-\eta, 0_K, 1, 0_K, -\eta) \text{ with } \eta = \eta(R, K) = (R^K + R^{-K})^{-1} \quad (7)$$

for some $R > 1$. The absolute value of (7) forms a trident with one main peak at the center, given by the energy $\|x\|_2^2 = 1$, and two equal side-peaks of $\eta \in [0, 1/2)$, see FIGS. 4A and 4B. FIG. 4B shows in blue circles the Huffman trident, given by the autocorrelation (7) of a Huffman sequence, and in red crosses the correlation of a Huffman sequence, given in FIG. 4A by blue circles, with the Huffman bracket or universal Huffman sequence, as pictured with red crossed in FIG. 4A. The BMOCZ symbols can be robust against noise if $$R_{uni} = R(K) = \sqrt{1 + \sin(\pi/K)} > 1, K \geq 2. \quad (8)$$

Hence, the BMOCZ constellation set $\mathscr{C}_*^K = \mathscr{C}_{\eta_*}^K$ with $\eta_* = \eta(R(K), K)$ is only determined by the number K. From the received N=L+K noisy signal samples (no CFO and no TO)

$$y_n = \sum_{k=0}^{K} x_k h_{n-k} + w_n = (x * h)_n + w_n, \quad n \in [N] \quad (9)$$

the BMOCZ decoder can perform Direct Zero-Testing (DiZeT) for each reciprocal zero pair $\mathscr{Z}_k$ on the received polynomial magnitude $|Y(z)| = |\Sigma_{n=0}^{N-1} y_n z^n|$ and can decide for the most likely one $$\hat{m}_k = \begin{cases} 1, & \left|Y\left(Re^{j2\pi\frac{k-1}{K}}\right)\right| < R^{-1}\left|Y\left(R^{N-1} e^{j2\pi\frac{k-1}{K}}\right)\right|, \\ 0, & \text{otherwise} \end{cases} \quad (10)$$

$$k = 1, \ldots, K,$$

where the inside zero samples are weighted accordingly.

Therefore, a global phase in Y(z) will have no effect on the decoder. But the CFO $\phi$ modulates the BMOCZ symbol in (4) and causes a rotation of its zeros by $-\phi$ in (5), which complicates the hypothesis test of the DiZeT decoder. Hence, communication systems in accordance with many embodiments of the invention estimate $\phi$ and/or use an outer code for BMOCZ to be invariant against an arbitrary rotation of the entire zero-set $\mathscr{Z}^K$. In many embodiments, before decoding can be performed, the TO of the symbol which yields to the convolution (9) is identified. Due to the symmetry of the zero-pattern and the energy concentration of the Huffman sequences, the BMOCZ design can address TO and CFO robustness and estimation, as is discussed further below.

Timing Offset and Effective Delay Spread for BMOCZ

In an asynchronous communication, the receiver typically does not know when a packet from a transmitter (user) will arrive. Hence, in communication systems in accordance with many embodiments of the invention the receiver initially must detect a transmitted packet, which is already one bit of information. It can be assumed that the receiver detects the transmitted packet correctly and that in an observation window of $N_{obs}=N_{noise}+K+L$ received samples, one single MOCZ packet of length K with maximal channel length of L is captured. By assuming a maximal length L and a known or a maximal K at the receiver, the observation window can be chosen, for example, as $N_{obs}=2N$. From the noise floor knowledge at the receiver, a simple energy detector with a hard threshold over the observation window can be used for a packet detection. An unknown $\tau_0 \in [N_{noise}]$ and CFO $\phi \in [0, 2\pi)$ can also be present in the observation window $$\tilde{r}_n = e^{jn\phi}(x*h)_{n-\tau_0} + \tilde{w}_n = (\tilde{x}*\tilde{h}T^{\tau_0})_n + \tilde{w}_n, n \in [N_{obs}]. \quad (11)$$

The challenge here is to identify $r_o$ and the efficient channel length which contains most of the energy of the instantaneous CIR realization h. In conventional communication systems, the estimation of this Time-of-Arrival (TOA) parameter can be performed by observing the same channel under many symbol transmissions, to obtain a sufficient statistic of the channel PDP. As noted above, where only one or a small number of observations are available, obtaining a good estimation can be very challenging.

The efficient (instantaneous) channel length $L_{ef}$, defined by an energy concentration window, is likely to be much less than the maximal channel length L, due to blockage and attenuation by the environment, which might also cause a sparse, clustered, and exponential decaying power delay profile. For the MOCZ scheme, it can be beneficial to correctly identify in the window (11) the first received sample $h_0 x_0$ from the transmitted symbol x, or at least to not miss it, since it will carry most of the energy if $h_0$ is the line of sight (LOS) path. For the optimal radius in BMOCZ, $x_0$ typically carries on average 1/4 to 1/5 of the BMOCZ symbol energy, see also FIGS. 4A and 4B. An overestimated channel length $L_{ef}$ can reduce overall bit-error performance, because the receiver can collect unnecessary noise samples.

Given an assumption of no CSI at the receiver, the channel characteristic, i.e., the instantaneous power delay profile, is determined entirely from the received MOCZ symbol. In a number of embodiments that utilize a BMOCZ scheme, the radar properties of the Huffman sequences can be exploited to obtain estimates of the timing offset and the effective channel delay in moderate and high SNR.

Huffman sequences have an impulsive autocorrelation (7), originally designed for radar applications, and are therefore very suitable to measure the channel impulse response. If the received signal r in (4) has no CFO and the transmitted sequence x is known at the receiver, correlation can be performed with x (matched-filter) and decision made based upon sample maximal energy $$\hat{\tau} = H(r) = \arg\max_{n \in [N_{obs}-K]} |(r * \overline{x^-})_{n+K^2}|^2 = \arg\max_{n \in [N_{obs}-K]} |(a * hT_\tau + w * \overline{x^-})_{n+K}|^2. \quad (12)$$

The above approach can be referred to as the HufED (Huffman Energy Detector), since the filtering with the conjugate-reciprocal sequence will detect in an ideal AGWN channel the noise distorted Huffman energy. When the transmitted Huffman sequence is unknown at the receiver, the received signal cannot be correlated with the correct Huffman sequence to retrieve the CIR. Instead, an approximative universal Huffman sequence can be used, which is just the first and last peak of a typical Huffman sequence, expressed by the impulses $(\delta_0)_k = \delta_{0k}$ and $(\delta_K)_n = \delta_{Kk}$ for $k \in [K+1]$ as $$\mathcal{H}_\psi = \delta_0 + e^{j\psi\delta_K} \in \mathbb{C}^{K+1} \quad (13)$$

which an be referred to as the K-Huffman bracket of phase $\psi$. Since the first and last coefficients are $$x_0 = -\sqrt{\sqrt{R^{2\|m\|_1 - K}\eta}}, x_K = -\sqrt{\sqrt{R^{-2\|m\|_1 + K}\eta}} \quad (14)$$

typical Huffman sequences, i.e., having same amount of ones and zeros, will have $$|x_0|^2 = |x_K|^2 = \eta. \quad (15)$$

Figure 4A:
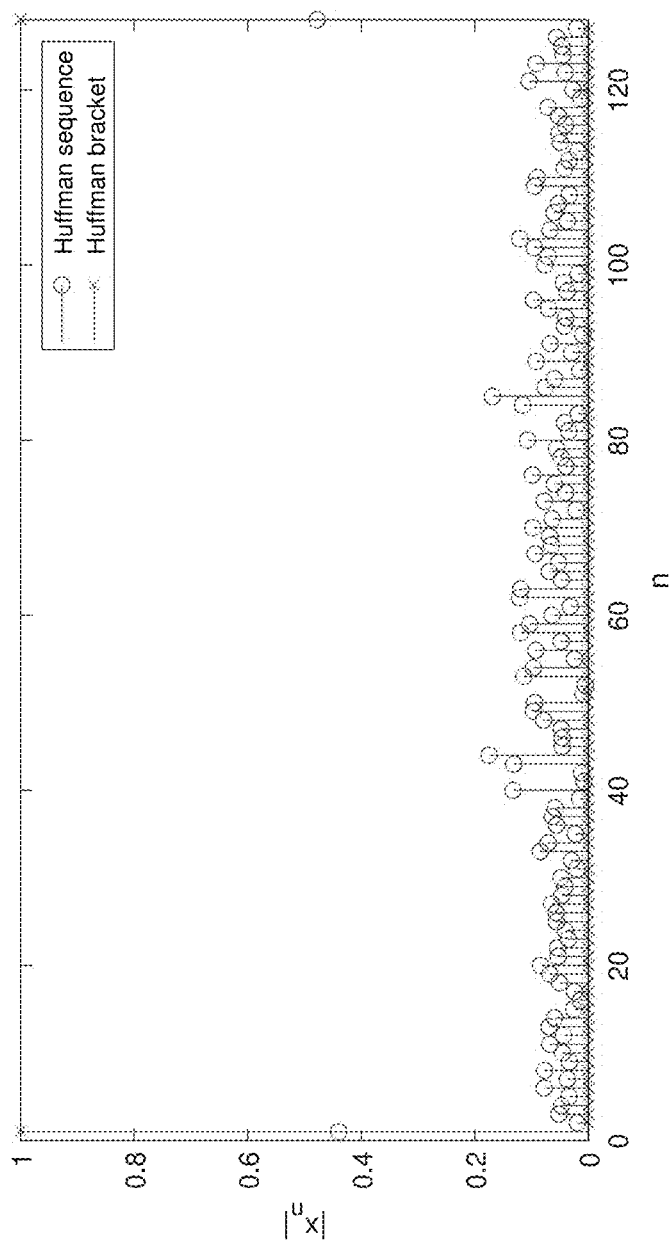
FIG. 4A shows the magnitudes of a Huffman sequence (BMOCZ symbol) for K=127, as pictured by blue circles, and a Huffman bracket or universal Huffman sequence, as pictured with red crosses.
Figure 4B:
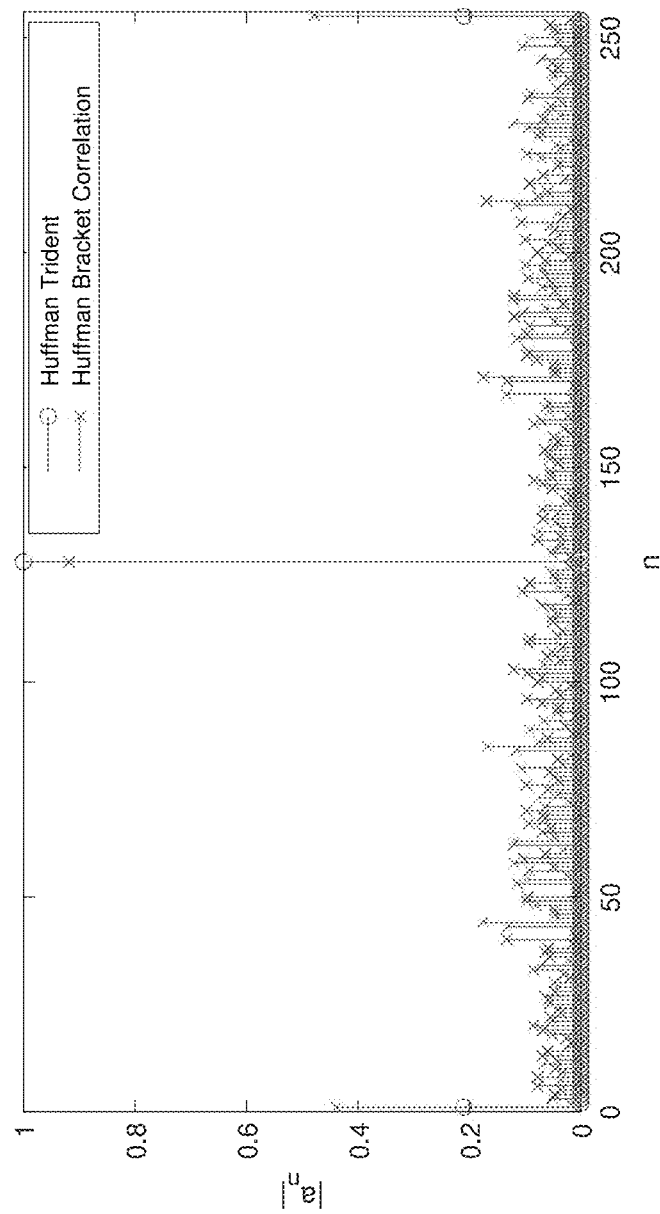
FIG. 4B shows the autocorrelation magnitudes as well as the correlation between the Huffman and bracket sequences of FIG. 4A.

By convolving the modulated Huffman sequence $\tilde{x}$ with the Huffman bracket $\mathcal{H}_\psi$, the locational properties of the Huffman autocorrelation (trident) are maintained $$\tilde{a} = \overline{\mathcal{H}_\psi} * \tilde{x} = (e^{-j\psi}x_0, e^{-j\psi}\dot{\tilde{x}}, x_0 + e^{j(K\phi - \psi)}x_K, \dot{\tilde{x}}, e^{jK\phi}x_K), \quad (16)$$

$$\tilde{x} = \overset{\circ}{x} + \dot{x},$$

where $\overset{\circ}{x} = x_0 \delta_0 + x_K \delta_K$ denotes the exterior signature and $\dot{x} = (0, x_1, \ldots, x_{K-1}, 0)$ the interior signature of the Huffman sequence x, see FIG. 4A. Here, the interior signature can be seen as the data noise floor distorting the trident a in (7). Taking the absolute-squares in (16), the three peaks of the approximated trident can be obtained as follows $$|\tilde{a}_0|^2 = |x_0|^2, |\tilde{a}_K|^2 = |x_0|^2 + |x_K|^2 - 2|x_0 x_K|\cos(K\phi - \psi),$$
$$|\tilde{a}_{2K}|^2 = |x_K|^2, \quad (17)$$

where the side-peaks have energy $$E_{sides} = |x_0|^2 + |x_K|^2 = (R^{2\|m\|_2 - K} + R^{-2\|m\|_1 + K})\eta \le \|x\|^2 = 1. \quad (18)$$

Since $\epsilon = 2\|m\|_1 - K \in [-K, K]$ we have $2 \le R^\epsilon + R^{-\epsilon} \le R^K + R^{-K}$ and $2\eta \le E_{sides} \le 1$, where the lower bounds are achieved for typical sequences with $\epsilon = 0$ (having the same amount of ones and zeros) and the upper bounds for $\epsilon = \pm K$ (all ones or all zeros). If $\eta = 1/2$ then the two coefficients (the exterior signature $\overset{\circ}{x}$) will carry all the energy of the Huffman sequence. But then also R=1 and the only Huffman sequences (real valued first and last coefficient) are given by $x_0 = \pm 1/\sqrt{2}$, $x_K = \pm 1/\sqrt{2}$ and $x_k = 0$ for kc else, which are the coefficients of polynomials with K uniform zeros on the unit circle. For R given by (8) the autocorrelation side-lobe $\eta$ is exponentially decaying in K but is bounded to $\eta \ge 1/5$ for K=1, 2, ..., 512. Hence, $E_{sides} \ge 0.4$, such that almost half of the Huffman sequence energy is always carried in the two peaks.

If the CFO were known, $\psi = K\phi - \pi$ could be set to obtain the center peak in (17)

$$E_{center} = |x_0|^2 + |x_K|^2 + 2|x_0||x_K| \ge 4\eta \ge 0.8, \quad (19)$$

i.e., the energy of the center peak is roughly twice as large as the energy of the side-peaks, and reveals the trident in the approximated Huffman autocorrelation ă. But, since the CFO is unknown in many embodiments of the invention and $K\phi-\psi\approx 2n\pi$ for some $n\in\mathbb{N}$ then $x_0+x_K\approx 0$ for typical Huffman sequences, such that the power of the center peak will vanish. Hence, in the presence of an unknown CFO, the center peak does not always identify the trident. Therefore the positive Huffman bracket $\mathcal{H}_0$ can be correlated with the absolute-square value of x or in presence of noise and channel with the absolute-square of the received signal ř, which will result approximately in $$d = \overline{\mathcal{H}_0} * |\tilde{r}|^2 = \overline{\mathcal{H}_0} * |\tilde{x}*\tilde{h}T^{\tau_0}|^2 + \overline{\mathcal{H}_0} * |\tilde{w}|^2 \approx |\check{a}|^2 * |\tilde{h}T^{\tau_0}|^2 + |\tilde{w}|^2 \in \mathbb{R}_+^{N_{obs}+K} \quad (20)$$

where w̃ and ŵ are colored noise and $$|\check{a}|^2 = (|x_0|^2, |\tilde{x}|^2, E_{sides}, |\tilde{x}|^{-2}, |x_K|^2) \quad (21)$$

denotes the noisy trident which collects three times the instant power delay profile $|h^2|$ of the shifted CIR. These three echos of the CIR can be separated where K≥L. The approximation in (20) can be justified by the isometry property of the Huffman convolution. Briefly, L<K, the generated (banded) L×N Toeplitz matrix $T_x = \Sigma_{k=0}^{K} x_k T^k$, for any Huffman sequence $x \in \mathscr{C}(K)$, is a stable linear time-invariant (LTI) system, since the energy of the output satisfies for any CIR realization $h \in \mathbb{C}^L$ $$\|x*h\|^2 = \|hT_x\|^2 = tr(hT_xT_x^*h^*) = tr(h^*A_xh) = \|x\|^2 tr(h^*h) = \|x\|^2 \|h\|^2. \quad (22)$$

Here. $A_x = T_x T_x^*$ is the L×L autocorrelation matrix of x, which is the identity scaled by $\|x\|^2$ if L≤K. Hence, each normalized Huffman sequence, generates an isometric operator $T_x$ having the best stability among all discrete-time LTI systems.

In several embodiments, instead of or in addition to taking the absolute-squares before correlating with the bracket $\mathcal{H}_x$, the receiver performs an average over different brackets. In several embodiments, the receiver takes P≥2 uniform phases $\psi_p = 2\pi p/P$ for $p \in [P]$. The receiver can then consider the average energy of all P bracket-filters, defining the filter $$F_{P,n}(\tilde{x}) = \frac{1}{P}\sum_{p=0}^{P-1} |\tilde{x} * \mathcal{H}_{\psi_p}|_n^2, n \in [N]. \quad (23)$$

For n=K $$F_{P,K}(\tilde{x}) = \quad (24)$$

$$\frac{1}{P}\sum_{p=0}^{P-1} |\tilde{x} * \mathcal{H}_{\psi_p}|_K^2 = |x_0|^2 + |x_K|^2 - \frac{2}{P}|x_0||x_K|\sum_{p=0}^{P-1} \cos\left(K\phi - \frac{2\pi p}{P}\right).$$

Since $$\sum_{p=0}^{P-1} \cos\left(K\phi - \frac{2\pi p}{P}\right) = \text{Re}\left(e^{jK\phi}\sum_{p=0}^{P-1} e^{-j\frac{2\pi p}{P}}\right)$$

for any $K\phi \in \mathbb{R}$ the term will vanish for any 2≤P∈ℕ by the orthogonality of the Fourier basis $$\frac{1}{P}\sum_{p=0}^{P-1} e^{-j\frac{2\pi p}{P}} = (F_P\delta_0)^H F_P\delta_1 = \delta_0^H \delta_1 = 0.$$

To reduce the effort a selection of P=2 can be made to yield to the center energy $|x_0|^2 + |x_K|^2 = E_{sides} \geq 2\eta$ for any normalized Huffman sequence. The other filter outputs are bounded by $$\max_{n\neq K} F_{2,n}(\tilde{x}) = \max_{n\neq K} \frac{1}{2}(|\tilde{x}*\kappa_0|_n^2 + |\tilde{x}*\kappa_\pi|_n^2) = \max_{k\in[K+1]} |x_k|^2.$$

In fact, the filter $F_{2,n}$ can be realized for any received signal y by taking the first approach, i.e. by taking the absolute-square of the received signal and then filtering with the bracket $\mathcal{H}_0$. i.e., $F_{2,n}(y) = (|y|^2 * \mathcal{H}_0)_n$. Note, that it holds trivially $\max\{|x_0|^2, |x_K|^2\} \leq F_{2,K}(\tilde{x})$ for K≥2, $\eta \in [0, 1/2]$, $\phi \in [0, 2\pi)$ and any $x \in \mathscr{C}(\eta)$. Moreover, the following holds $$\max_{k\in\{1,2,\ldots,K-1\}} |x_k|^2 \leq 1 - (|x_0|^2 + |x_K|^2) \leq 1 - 2\eta. \quad (26)$$

Processes that can be utilized to perform timing offset estimation in accordance with various embodiments of the invention are discussed further below.

Timing Offset Estimation

The delay of the strongest path $|h_s| = \|h\|_\infty$ can be identified from the maximum in (20)

$$\hat{t} = \left(\underset{t\in[N_{obs}+K]}{\arg\max} d_t\right) - K = \left(\underset{t\in[N_{obs}-K]+K}{\arg\max} d_t\right) - K, \quad (27)$$

where the last equality follows from the fact that both peaks $\mathcal{H}_0$ are contributing between K and $N_{obs}$. If the CIR has a LOS path, then s=0 and an estimate for the timing-offset can be found by $\hat{\tau}_0 = \hat{t}$.

Figure 5A:
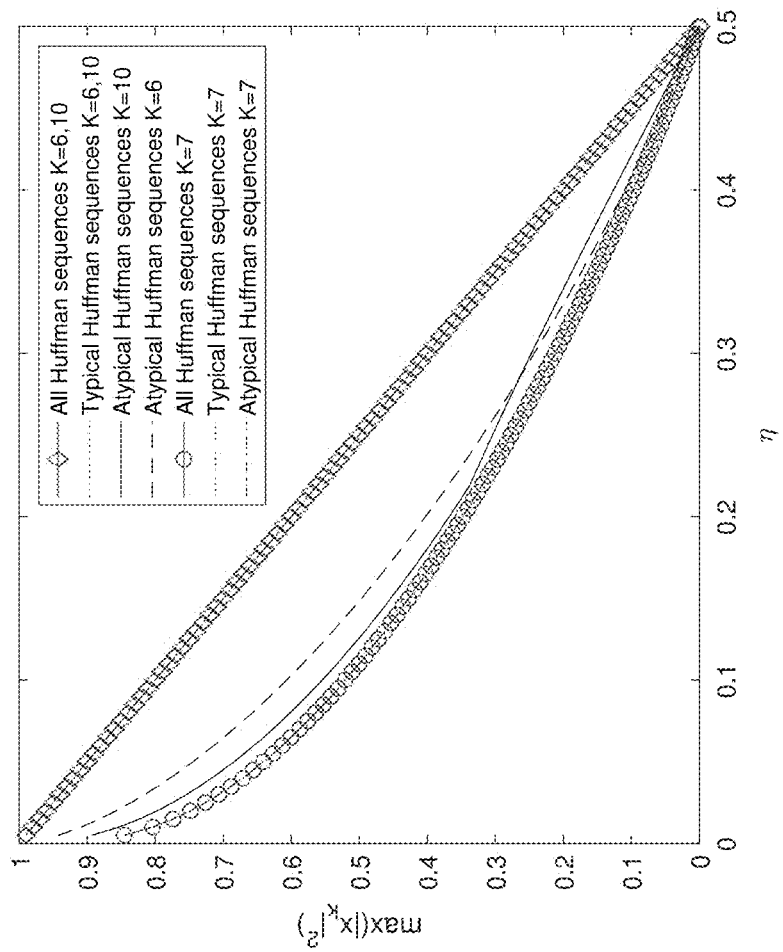
FIG. 5A shows maximal interior Huffman sample energies for $K \in \{6, 7, 10\}$ over $\eta$.

When the receiver takes an average over different brackets, simulations reveal the existence of a typical sequence attaining an energy peak of 1−2η, for even K see FIG. 5A. The maximal absolute-square value (peak-power) over η of all Huffman sequences is plotted by a blue diamond line. Typical sequences, denoted by dotted line, achieve the maximal peak-power, whereas atypical or odd-length Huffman sequences have a lower peak-power. Due to the energy normalization, such sequences cannot have more than 3 non-zero coefficients by (26). In fact, it can be shown that for even K the center coefficient $x_{K/2}$ carries the remaining energy. Opposed to codebooks with K odd, where typical sequences have one more or one less zero outside than inside, the bound in (26) is not achievable. If the receiver searches for the energy of the trident the TO estimation of $\tilde{x}_\tau = xT_\tau M_\phi$ can be improved by the average Trident Energy Detector (aveTriED), which collects the energy of all three peaks $$\tau_0 = \arg\max_n F_{2,n+K}(\tilde{x}_\tau) + 2F_{2,n+2K}(\tilde{x}_\tau) + F_{2,n+3K}(\tilde{x}_\tau) \quad (28)$$

for any $K \geq 2$, $\tau_0 \in \mathbb{N}$, $\phi \in \mathbb{R}$, $1/2 \geq \eta > 1/4$ and $x \in \mathscr{C}_\eta^K$. Here, the center peak is weighted by a factor of two, since it carries the energy of both side-peaks. To increase the maximal filter output further, a maximal energy filter can be utilized in accordance with many embodiments of the invention, which is defined by $$\tilde{F}_{P,n}(\tilde{x}) = \max_{p \in |P|} |\tilde{x} * \kappa_{2\pi p/P}|_n^2 = \begin{cases} \max_{p \in |P|} |\tilde{x} * \kappa_{2\pi p/P}|^2, & n = K \\ |x_{n \bmod K}|^2, & n \text{ else,} \end{cases} \quad (29)$$

where for n=K the center energy is increased by maximizing over the P phases $$\tilde{F}_K(\tilde{x}) = \qquad (30)$$

$$\max_{p \in [P]} |\tilde{x} * \kappa_{2\pi p/P}|_K^2 = |x_0|^2 + |x_K|^2 - 2|x_0||x_K| \min_{p \in [P]} \cos(2\pi p/P - K\phi).$$

Since $K\phi$ is uniformly distributed, induced by the channel CFO, p can be selected such that $K\phi - \pi \in [(p-1)/P, p/P]2\pi$. Hence, the worst case estimation ($\phi = p\pi/KP$ for some p) would be $-\cos(\pi - \pi/P) = \cos(\pi/P) \geq 1 - 2/P + (\pi - 2)(P-2)/P^2 \geq 3/4$ for $P \geq 6$, by the extended Kober's inequality, such that for any $x \in \mathscr{C}_{*\eta}^K$ and $\phi \in \mathbb{R}$ it holds $$\tilde{F}_{6,K}(\tilde{x}) = \max_{p \in [6]} |\tilde{x} * \kappa_{2p\pi/6}|_K^2 > |x_0|^2 + |x_K|^2 + 2|x_0||x_K|\frac{3}{4} \geq \frac{5}{2}\eta. \quad (31)$$

Hence, for $x \in \mathscr{C}_{*\eta}^K$ and $\tilde{x}_\tau = xT_{\tau_0}M_\phi$ with $\tau \in \mathbb{N}$ the max-TriED will identify the true TO $$\tau_0 = \hat{n} = \operatorname*{argmax}_n \tilde{F}_{6,n+K}(\tilde{x}_\tau) + 2\tilde{F}_{6,n+2K}(\tilde{x}_\tau) + \tilde{F}_{6,n+3K}(\tilde{x}_\tau). \quad (32)$$

Figure 5B:
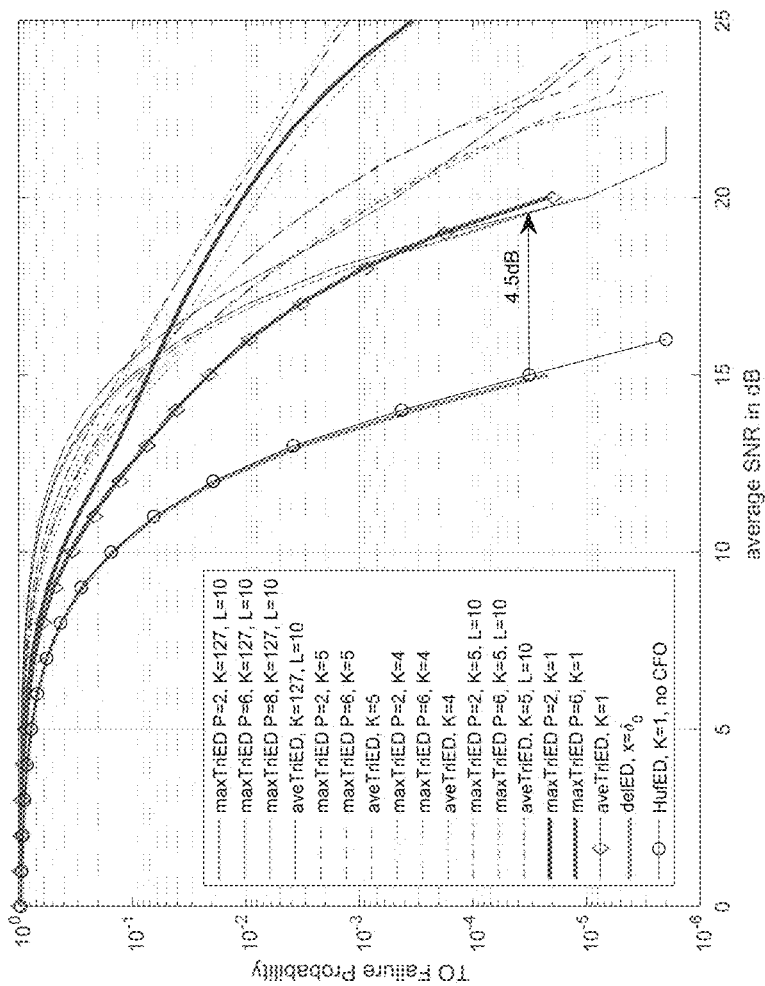
FIG. 5B shows probability of wrong timing offset detection over SNR for ideal AWGN channels and multipath with L=10, LOS path and p=0.98 with random CFO for $5 \cdot 10^5$ runs per SNR point and $N_{obs}$=270 for K∈{1, 4, 5, 127} with $R_{uni}$(K) in equation (8) below.

In FIG. 5B the results of simulations are illustrated for the failure probability for various K's and fixed observation window $N_{obs}=4K_{max}=508$ of the maxTriED and aveTriED over $5 \cdot 10^5$ runs, by drawing uniformly in each run a $x \in \mathscr{C}_{*\eta}^K$, a CFO $\phi \in [0, 2\pi)$, a TO $\tau \in [128]$, and i.i.d. additive noise $w \in \mathcal{CN}(0, N_0)^N$. Furthermore, performance was simulated over ideal AWGN channels and for multipath channels with L=10 paths, with LOS and power delay exponent $\rho=0.95$. As an ultimate comparison for an ED based TOA estimation, a delta pulse $\delta_0$ was used as a transmit signal and the matched filter detector delED. In an ideal AWGN channel scenario at high SNR the same failure probability as delED is attained for maxTriED with P=6 and $K_{max}=127$ at only 4.5 dB more, see FIG. 5B. The performance loss can be explained by the power distribution, since the energy on the two peaks is roughly $\eta_* \sim 1/5$. Furthermore, the maxTriED can only influence the CFO of one peak. If no CFO were present, and the Huffman sequence would be known at the receiver, the HufED detector in (12) would obtain the same performance as the delED detector. It should be noted that a more sophisticated estimation can be utilized, which can detect an error by a missing trident structure or by exploiting soft-threshold and/or repetition/diversity methods. As can readily be appreciated, the specific detector utilized to detect TO largely depends upon the requirements of specific applications.

In case of NLOS or if the first paths are equally strong, then processes in accordance with several embodiments of the invention can go further back and identify the first significant peak above the noise floor, since the convolution sum of the CIR with the interior signature might produce a significant peak. It should be noted that this might result in a misidentification of the trident's center peak by (27), for example if $|h_s|/|h_0| \gg 1$. Therefore, processes in accordance with several embodiments of the invention can utilize a peak threshold $$\rho = \rho(Kd) = \frac{1}{K+1} \sum_{n=\hat{s}+\hat{\tau}_0}^{\hat{s}+\hat{\tau}_0+K} d_n, \qquad (33)$$

which is the average power of the Huffman sequence distorted by the channel and noise. The noise-dependent threshold can be set based upon the Noise Power $N_0$ to $$\rho_0 = \max\{\rho(K,d)/10, \ldots, \rho(K,d)/100, 10 \cdot N_0\} \qquad (34)$$

By using an iterative back stepping in Algorithm 1 as shown in FIG. 6, the process can stop if the sample power falls below the threshold $\rho_0$, which finally yields an estimate $\hat{\tau}_0$ of the timing-offset. In line 3 of Algorithm 1 in FIG. 6 the timing-offset estimate is updated, if the sample power is larger than the threshold $\rho_0$ and the average power of the preceding samples is larger than the threshold divided by 1+(log b)/3, which will be weighted by the amount b of back-steps. We call the algorithm in FIG. 6 therefore a center-peak-back-step (CPBS) algorithm. As can readily be appreciated, any of a variety of thresholds and/or algorithms can be utilized in determining timing offsets as appropriate to the specific MOCZ scheme utilized and or the specific requirements of particular applications in accordance with various embodiments of the invention. Processes for performing channel length estimation in accordance with certain embodiments of the invention are discussed further below.

Efficient Channel Length Estimation

Since a communication system that utilizes BMOCZ does not, need any channel knowledge at the receiver, it is also well suited for estimating the channel itself at the receiver. Here, a good channel length estimation is helpful for the performance of the decoder, particularly if the power delay profile (PDP) is decaying. At some extent, the channel delays will fade out exponentially and the receiver can cut-off the received signal by using a threshold such as (but not limited to) a certain energy ratio threshold. The average received SNR is $$rSNR = \frac{\mathbb{E}[\|x * h\|^2]}{\mathbb{E}[\|w\|^2]} = E\frac{\mathbb{E}[\|h\|^2]}{N \cdot N_0} = \frac{1}{N_0} \qquad (35)$$

where $E = \|x\|^2 = N$ is the energy of the BMOCZ symbols, which is constant for the codebook. If the power delay profile is flat, then the collected energy is uniform and the SNR is unlikely to change if the channel length at the receiver is cut. However, the additional channel zeros can increase the confusion for the DiZeT decoder and may reduce BER performance. Therefore, the performance can decrease for increasing L at a fixed symbol length K. For the most interesting scenario of $K \approx L$ the BER performance loss is only 3 dB over $E_b/N_0$, but will increase dramatically if $L \gg K$. The reason for this behaviour is the collection of many noise taps, which can lead to more distortion of the transmitted zeros. Since in most realistic scenarios the PDP will be decaying, most of the channel energy is typically concentrated in the first channel taps. Hence, cutting the received signal length to $N_{eff}=K+L_{eff}$, can reduce the channel length to $L_{eff}<L$ and improve the rSNR for non-flat PDPs with p<1, since it holds $$\frac{1}{N_0} = \frac{N\left(\sum_{l=0}^{L_{eff}-1} p^l + p^{L_{eff}} \sum_{l=0}^{L-L_{eff}} p^l\right)}{N \cdot N_0} \approx \frac{N \sum_{l}^{L_{eff}-1} p^l}{(K+L)N_0} < \frac{N \sum_{l}^{L_{eff}-1} p^l}{(K+L_{eff})N_0} = \frac{N\mathbb{E}[\|h_{eff}\|^2]}{N_{eff}N_0}. \quad (36)$$

Since $1/\mathbb{E}[\|h_{eff}\|^2] \ll N/N_{eff}$ a significant gain in SNR can be obtained if $L \gg K$ and $p<1$. Hence, by cutting the received signal to the effective channel length, given by a certain energy concentration, the SNR, can be improved and, at the same time, the amount of channel zeros can be reduced, which is demonstrated in the simulations discussed below.

Assuming knowledge of the noise floor $N_0$ at the receiver, a cut-off time can be defined as a window of time which, for example, contains 95%, of the received energy. As can readily be appreciated, the cut-off time can be determined using any of a variety of techniques appropriate to the requirements of a specific application in accordance with various embodiments of the invention.

Figure 7A:
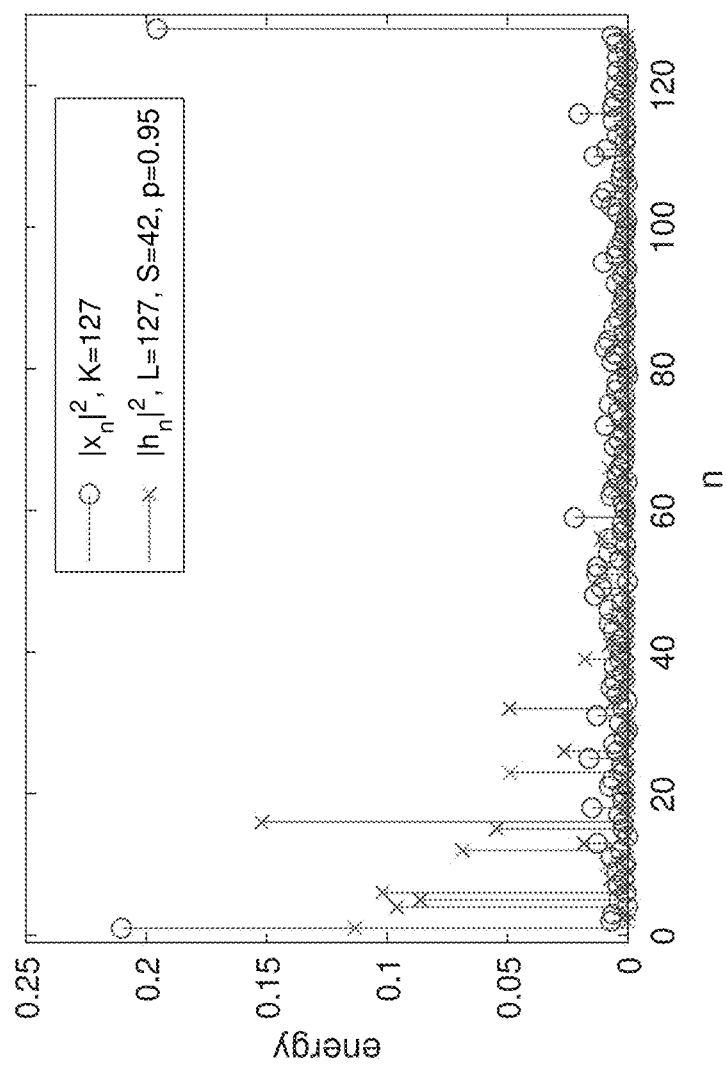
FIG. 7A shows the absolute-square (energy) of the CIR samples (red crosses) and of the samples of a BMOCZ symbol (blue circles). The CIR experience only NLOS paths with length L=127 and S=83 active paths at an average power decay of $p^n$=0.95" for the nth delay. The normalized BMOCZ symbol has K=127 zeros with 62 outside the unit circle (bit-value one).
Figure 7B:
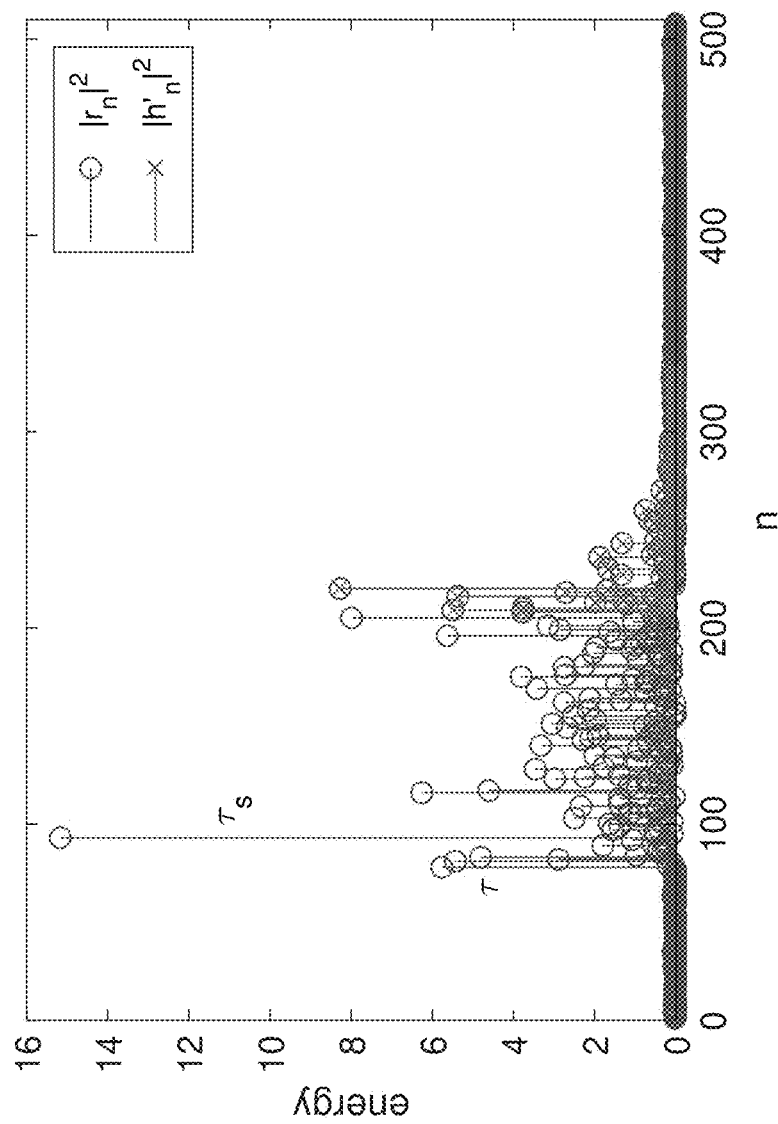
FIG. 7B shows the corresponding received energy samples (blue-circles) at SNR=18 dB. An approximation of the CIR energy samples (red-crosses) $|h_n'|^2$ can be observed as an echo of the last BMOCZ coefficient. The efficient CIR length is determined at $L_{eff}$=81 at a timing offset of τ=77 with strongest path at $τ_s$=92.

In several embodiments of the invention, the estimation of the channel length $L_{eff}$ is performed after the detection of the timing-offset $\tau_0$ with Algorithm 1 from FIG. 6. It can be assumed that the maximal channel delay is L. Since the BMOCZ symbol length is K+1, it is known that the samples $r_h = (r_{\tau_0+K+1}, \ldots, r_{\tau_0+K+L})$ of the received time-discrete signal in (4), which is the CIR, correlated by shifts of x and distorted by additive noise (ignoring here the CFO distortion since it is not relevant for the PDP estimation), see FIGS. 7A and 7B. FIG. 7B shows the received signal in blue, given by the Huffman sequence in blue circles and the CIR in red crosses, pictured in FIG. 7A. The last channel tap $h_{L_{eff}}$ will be multiplied by $|x_K|^2$, which can be as strong as $|x_0|^2$ on average.

There are many signal processing methods that can be utilized to detect the efficient energy window $N_{eff}$ in the received samples, including (but not limited to) total variation smoothing, or regularized least-square methods which promotes short window sizes (sparsity). In several embodiments, the process (i.e. Algorithm 2) shown in FIG. 8 is utilized, which iteratively increases $L_{eff}$ starting at 1 and increasing until enough channel energy is collected. The estimate channel/signal energy can be set to $$E_r = \|r_h\|^2 - LN_0 \quad (37)$$

starting with the maximal CIR length L. By assuming a path exponent of p, processes in accordance with various embodiments of the invention can calculate a threshold for the effective energy $E_{eff} \approx \mu E_r$ with $\mu = p^{LN_0/2E_r}$. The process can then collect as many samples $L_{eff}$ of $r_h$ until the energy $E_{eff}$ is achieved and set $N_{eff} = K + L_{eff}$. The extracted modulated signal can then be given by $$\tilde{y} = (\tilde{r}_{\tau_0}, \tilde{r}_{\tau_0+1}, \ldots, \tilde{r}_{\tau_0+N_{eff}-1}), \quad (38)$$

which can be further processed for CFO detection and final decoding as is discussed further below.

While specific processes are described above for performing channel length estimation, any of a variety of techniques for performing channel length estimation can be utilized as appropriate to the requirements of specific applications in accordance with various embodiments of the invention. Processes for determining CFOs in accordance with various embodiments of the invention are discussed further below.

Carrier Frequency Offset

When processes similar to those described above are utilized to estimate timing offset, processes in accordance with several embodiments of the invention can attempt to estimate a CFO assuming that the down-converted baseband signal in (11) has no further timing-offset and captured all path delays up to N=K+L. Under these assumptions, the signal can further be assumed to experience an unknown CFO of $\phi \in [0, 2\pi)$ $$\tilde{y}_n = e^{jn\phi}(x*h)_n + w_n, n \in [N]. \quad (39)$$

This is a common problem in many multi-carrier systems, such as OFDM, which therefore often require CFO estimation algorithms as noted above. For a bandwidth of W=1/T, the relative frequency offset is $$\epsilon = \Delta f \cdot T = \Delta f/W. \quad (40)$$

Given a carrier frequency of $f_c=1$ GHz with a drastic frequency offset of $\Delta f \in [-1, 1]$ MHz and bandwidth W=1 Mhz, this would result in a relative frequency offset $\epsilon \in [-1, 1]$, which is able to rotate all zeros by any $\phi = 2\pi\epsilon \in [0, 2\pi)$ in the z-plane. Hence, the received polynomial (noiseless) will experience a rotation of all its N-1 zeros by the angle $\phi$ $$\tilde{Y}(z) = \sum_{n=0}^{N-1} \tilde{y}_n z^n = \sum_{n=0}^{N-1} y_n e^{jn\phi} z^n = \quad (40)$$

$$Y(e^{j\phi}z) = y_{N-1} \prod_{n=1}^{N-1} (e^{j\phi}z - \gamma_n) = e^{j\phi(N-1)} y_{N-1} \prod_{n=1}^{N-1} (z - \gamma_n e^{-j\phi}) =$$

$$e^{-j\phi(N-1)} x_K h_{L-1} \prod_{k=1}^{K} (z - \alpha_k e^{-j\phi}) \prod_{l=1}^{L-1} (z - \beta_l e^{-j\phi}).$$

As illustrated in FIG. 3 for K=6, each rotated zero (red) $\tilde{\alpha}_k = e^{-j\phi}\alpha_k$ ideally does not leave the zero-codebook set (blue)

$$\mathscr{Z} = \mathscr{Z}(K) := \left\{ R^{\pm 1} e^{j2\pi \frac{k}{K}} \mid k \in [K] \right\}.$$

To apply the DiZeT decoder, decoding processes in accordance with many embodiments of the invention find $\theta$ such that $e^{j\theta}\alpha \in \mathscr{Z}$, i.e., ensuring that all the K data zeros will lie on the uniform grid. Hence, for $\theta_K = 2\pi/K$ the CFO can be split into $$\phi = l\theta_K + \theta \quad (42)$$

for some $l \in [K]$ and $\theta \in [0, \theta_K)$, where l is called the integer and $\theta$ the fractional CFO. When $\theta=0$ (or is correctly compensated), the DiZeT decoder can sample at correct zero positions and decode a cyclic permuted bit sequence $\hat{m}=mS^l$ of the transmitted message. The cyclic permutation is due to the unknown integer shift l, which can be corrected by use of a cyclically permutable code to encode the transmitted data in accordance with various embodiments of the invention and as is discussed further below.

Decoding BMOCZ via FFT

In many embodiments, the DiZeT decoder for BMOCZ can allow a simple hardware implementation at the receiver. In a number of embodiments, the received samples $y_n$ are scaled with the radius powers $R^n$ respectively $R^{-n}$ $$y D_R := y \begin{pmatrix} 1 & 0 & \cdots & 0 \\ 0 & R & \cdots & 0 \\ \vdots & & \ddots & \vdots \\ 0 & 0 & \cdots & R^{N-1} \end{pmatrix}. \quad (43)$$

By applying the $\tilde{N}$-point unitary I)FT matrix $F^*$ on the $N_0$ zero-padded scaled signal, where $\tilde{N}=QK$ with $Q:=\lceil N/K \rceil$, the samples of the z-transform can be obtained $$\sqrt{\tilde{N}} \, y(D_R 0_{N,QK-N}) F^* =$$

$$\left( \sum_{n=0}^{N-1} y_n R^n e^{j2\pi \frac{0 \cdot n}{\tilde{N}}}, \ldots, \sum_{n=0}^{N-1} y_n R^n e^{j2\pi \frac{(\tilde{N}-1)n}{\tilde{N}}} \right) = Y(\alpha_Q^{(1)})$$

where $$\alpha_{Q,k}^{(m)} = \alpha_k^{(m)} \left( e^0, \ldots, e^{j2\pi \frac{Q-1}{QK}} \right) \in \mathbb{C}^Q.$$

Hence, the DiZeT decoder simplifies to $$\hat{m}_k = \begin{cases} 1, & |y\tilde{D}_R F^*|_{Q(k-1)} < R^{K-1} |y\tilde{D}_{R^{-1}} F^*|_{Q(k-1)}, \\ 0, & \text{else} \end{cases} \quad (44)$$

$$k = 1, \ldots, K.$$

Here, $Q \geq 2$ can be seen as an oversampling factor of the IDFT, where each Qth sample point is picked to obtain the zero sample values. Hence, in many embodiments the decoder can be fully implemented by a simple IDFT from the delayed amplified received signal, by using for example FPGA or even analog front-ends. The diagonal scaling matrix (43) can be rewritten in the symmetric form $$D_R := \text{diag}(R^{(N-1)/2}, \ldots, R^{-(N-1)/2}) = R^{-(N-1)/2} D_R, \quad (45)$$

such that $D_R^{-1} = D_{R^{-1}}$ corresponds to a time-reversal of the diagonal, which results in $$|t\tilde{D}_R F^*_{QK}|_{Qk} \leq |\overline{y} \, \tilde{D}_R F^*_{QK}|_{Qk}, k \in [K], \quad (46)$$

since the absolute values cancel the phases from a circular shift $S$ and the conjugate-time-reversal $\overline{y} = \overline{y} S \Gamma$, where $\Gamma = F^2$ is the circular time-reversal, can be rewritten by using $F^* \Gamma = \overline{F} = F^*$.

Fractional CFO Estimation Via Oversampled FFTs

To estimate the factional frequency offset, oversampling can be performed in many embodiments of the invention by choosing $Q > \lceil N/K \rceil$ to add $Q$ further $K$ zero blocks to $D_R$. This can lead to an oversampling factor of $Q$ and allows quantization of $[0, \theta_K)$ in $Q$ uniform bins with separation $\phi_Q = \theta_K/Q$ for a base angle $\theta_K = 2\pi/K$. Hence, the absolute values of the sampled z-transform in (39) of the rotated codebook-zeros are given by $$|\tilde{Y}(e^{jq\phi_Q} \alpha_k^{(1)})| = |\tilde{y} \tilde{D}_R F^*_{QK}|_{Qk \oplus_{\tilde{N}} q}, \quad (47)$$

$$|\tilde{Y}(e^{jq\phi_Q} \alpha_k^{(0)})| = |\overline{\tilde{y}} \, \tilde{D}_R F^*_{QK}|_{Qk \oplus_{\tilde{N}} q}$$

for each $q \in [Q]$ and $k \in [K]$, where $\oplus_N$ is addition modulo N. To estimate the fractional frequency offset of the base angle, the K smaller sample values can be summed and the fraction corresponding to the smallest sum selected $$\hat{q} = \arg \min_{q \in [Q]} \sum_{k=1}^{K} \min \left\{ |\tilde{y}_m \tilde{D}_R F_{QK}|_{Qk \oplus_{\tilde{N}} q}, |\overline{\tilde{y}_m} \tilde{D}_R F_{QK}|_{Qk \oplus_{\tilde{N}} q} \right\} \quad (48)$$

$$\text{and } \hat{\theta} = \frac{\hat{q}}{Q} \theta_K.$$

Figure 9:
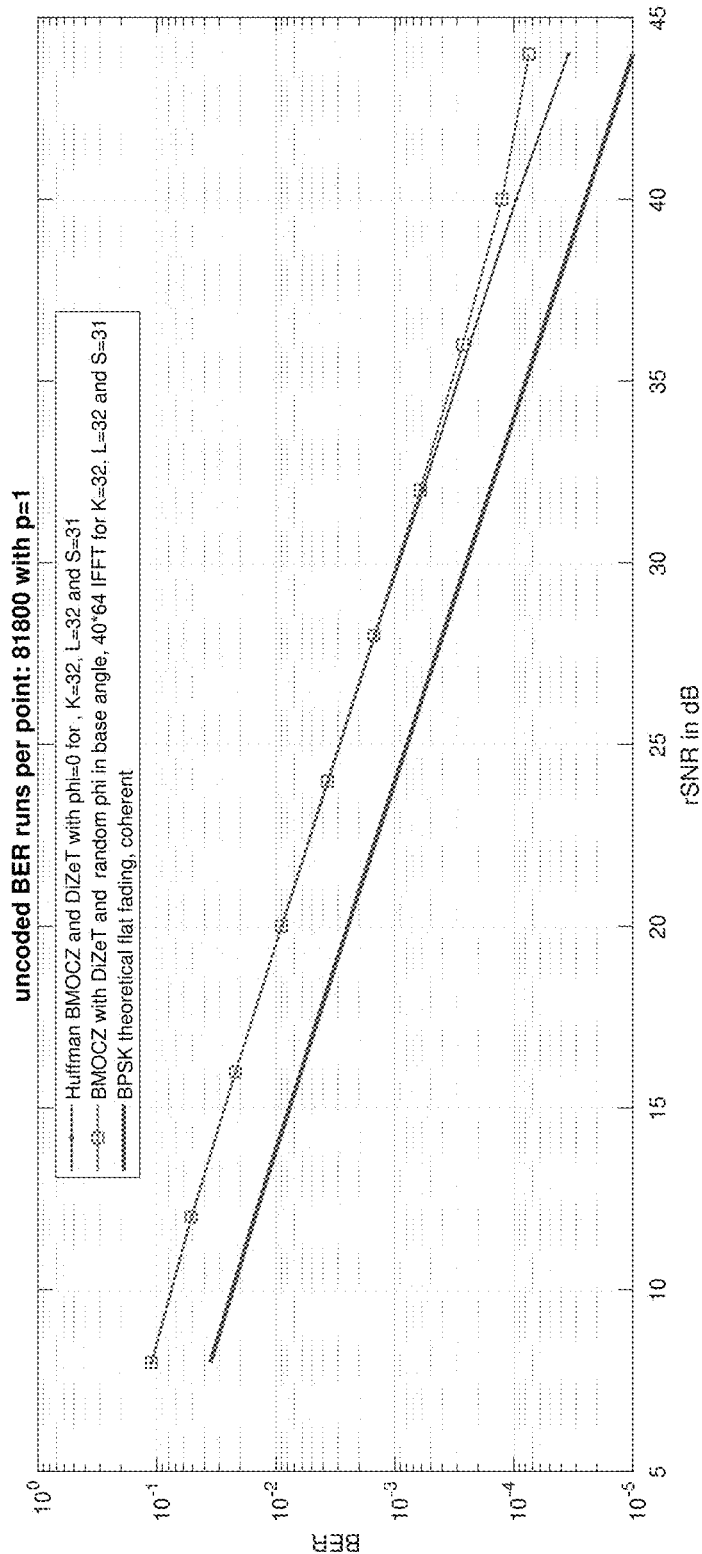
FIG. 9 is a chart showing bit-error-rate (BER) over rSNR for BMOCZ with DiZeT for random ϕ∈[0, $θ_K$/2) for L=K=32.

Then the recovered signal $\hat{y} = \tilde{y} M^{-\hat{\theta}}$ will have the data zeros on the constellation grid $\mathscr{X}_K$. See FIG. 9 for the BER performance degradation of BMOCZ under a random fractional CFO $\phi \in [0, \theta_{32}]$ and FIG. 3 for a schematic picture of the fractional zero rotation.

Using Cyclically Permutable Codes

To be robust against rotations which are integer multiples of the base angle, an outer block code in $\mathbb{F}_2^K$ can be used for the binary message $m \in \mathbb{F}_2^B$, which is invariant against cyclic shifts, e.g., a bijective mapping on the Galois Field $\mathbb{F}_2 = \{0, 1\}$ $$\mathcal{G}: \mathbb{F}_2^B \to \mathbb{F}_2^K, m \mapsto c = \mathcal{G}(m) \quad (49)$$

such that $\mathcal{G}^{-1}(cS^l) = m$ for any $l \in [K]$. The common notation for the code length $n = K$ can be used. Such a block code is called a cycling register code (CRC) $\mathscr{C}_{CRC}$, which can be constructed from the linear block code $\mathbb{F}_2^n$, by separating it in all its cyclic equivalence classes $$[c]_{CRC} = \{cS^l | l \in [n]\}, c \in \mathbb{F}_2^n \quad (50)$$

where c has cyclic order v if $cS^v = c$ for the smallest possible $v \in \{1, 2, \ldots, n\}$. To make coding one-to-one, each equivalence class can be represented by the codeword $\tilde{c}$ with smallest decimal value, also called a necklace. Then $\mathbb{F}_2^n$ is given by the union of all its $M_{CRC}$ equivalence class representatives and its cyclic shifts. i.e.

$$\mathbb{F}_2^n = \bigcup_{i=1}^{M_{CRC}} \{\tilde{c}_i S^l | l = 1, \ldots, v(i)\} \quad (51)$$

In a number of embodiments, the above expression can be utilized to generate in a systematic way a look-up table for the cycling register code. Unfortunately, the construction is non-linear and combinatorial difficult. However, the cardinality of such a code can be proven explicitly for any positive integer n to be (number of cycles in a pure cycling register)

$$|\mathscr{C}_{CRC}(n)| = \frac{1}{n}\sum_{d|n}\Phi(d)2^{n/d} \quad (52)$$

where $\Phi(d)$ is the Euler function, which counts the number of elements $t\in[d]$ coprime to d.

For n prime, the following can be obtained $$|\mathscr{C}_{CRC}(n)| = \frac{1}{n}(2^n + (n-1)2) \geq \frac{2^n}{n} = 2^{n-\log_2 n} \quad (53)$$

which would allow a transmitter to encode at least $B=n-\lceil \log n \rceil$ bits. For n=K=31 this would result in a loss of only 5 bits and is similar to the loss in a BCH-(31,26) code, which can correct 1 bit error. Note, the cardinality of a cycling register code $\mathscr{C}_{CRC}$ is minimal if n is prime. This can be seen by acknowledging the fact that the cyclic order of a codeword is always a divisor of n. Therefore, if n is prime the trivial orders 1 and n are present, where the only codewords with order v=1 are the all one 1 and all zero 0 codeword and all other codewords have the maximal or full cyclic order v=n. Hence, extracting the CRC from $\mathbb{F}_2^n$ obtains the same cardinality (53). Taking from a block code of length n only the codewords of maximal cyclic order n and selecting only one representative of them defines a cyclically permutable code (CPC). If n is prime, only two equivalence classes in $\mathscr{C}_{CR}$ are not of maximal cyclic order, hence the cardinality for a CPC if n is prime is at most $(2^n-2)/n$.

However, the construction of CPCs, even for n prime, is a combinatorial problem, especially the decoding. Hence, to reduce the combinatorial complexity, many approaches starting from cyclic codes and extract all codewords with maximal cyclic order. Since a cyclic $(n, k, d_{min})$ code corrects up to $(d_{min}-1)/2$ bit errors, any CPC code extraction will inherit the error correction capability.

In many embodiments, a CPC can be constructed from a binary cyclic $(n, k, d_{min})$ code by still obtaining the best possible cardinality $(2^k-2)/n$ if n is a Mersenne prime. An affine subcode can be extracted from the CPC with maximal dimension, which can be referred to as an affine cyclically permutable code (ACPC). This allows a linear encoding of $B=k-\log(n+1)$ bits by a generator matrix and an additive non-zero row vector, which defines the affine translation.

CPC Construction from Cyclic Codes

Cyclic codes exploit efficiently the algebraic structure of Galois fields $\mathbb{F}_q$, given by a finite set having a prime power cardinality $q=p^{m'}$. A linear block code over $\mathbb{F}_q$ is a cyclic code if each cyclic shift of a codeword is a codeword. It is a simple-root cyclic code if the characteristic p of the field $\mathbb{F}_q$ is not a divisor of the block length n. If the block length is of the form $n=q^m-1$, it can be referred to as a primitive block length and if the code is cyclic it can be called a primitive cyclic code. In a number of embodiments, binary cyclic codes of prime length $n=2^m-1$ with $q=p=2$ are utilized, which are simple-root and primitive cyclic codes. Due to the linearity of cyclic codes, they can be encoded and decoded by a generator G and check matrix H in a systematic way. The cardinality of a binary cyclic (n, k) code is always $M_c=2^k$. Hence, for cyclic codes of prime length n, the partitioning in equivalence classes of maximal cyclic order and selecting one codeword as their representative provides, leaves us with a maximal cardinality of $$|\mathscr{C}_{CPC}| \leq \frac{2^k - 1}{n}. \quad (54)$$

for any extracted CPC. Note, the zero codeword is always a codeword in a linear code but has cyclic order one and hence is typically not an element of a CPC. To exploit the cardinality most efficiently, the goal is to find cyclic codes such that each non-zero codeword has maximal cyclic order. In several embodiments, codes are constructed for prime code lengths of the form $n=2^m-1$, also known as Mersenne primes. For m=2, 3, 5, 7 this applies to K=n=3, 7, 31, 127, which are relevant signal lengths for binary short-messages. Furthermore, several embodiments only consider cyclic codes which have 1 as a codeword. Since n is prime, each codeword, except 0 and 1 has maximal cyclic order. Hence, each codeword of a cyclic (n, k) code has maximal cyclic order and since it is a cyclic code all its cyclic shifts must be also codewords. Hence the cardinality of codewords having maximal order is exactly $M=2^k-2$. In a number of embodiments, the cyclic code is partitioned in its cyclic equivalence classes, which leaves $|\mathscr{C}_{CPC}|=M/n=(2^k-2)/n$. Note, this number is indeed an integer, by the previous mentioned properties. The main advantages of the construction described herein (also referred to as the Kuribayashi-Tanaka (KT) construction) is the systematic code construction and the inherit error-correcting capability of the underlying cyclic code, from which the CPC is constructed. Furthermore, combining error-correction and cyclic-shift corrections can provide advantages in many systems that utilize BMOCZ in accordance with various embodiments of the invention.

In a number of embodiments, an inner $\mathscr{C}_{in}$-(k, k-m) cyclic code is utilized in combination with an outer $\mathscr{C}_{out}$-(n, k) cyclic code, where the inner cyclic codewords are affine translated by the Euclidean vector $e_1=(1, 0, \ldots, 0)\in \mathbb{F}_2^k$. In this sense, the CPC construction is offline. This can be realized by an offline mapping from $\mathbb{F}_2^{k-m}$ to $\mathbb{F}_2^n$, which can be represented by the BCH generator matrices $G_{in}$ and $G_{out}$ together with the affine translation $e_1$ as $$\mathscr{G}: \mathbb{F}_2^{k-m} \to \mathscr{C}_{in}+e_1 \to \mathscr{C}_{out} \subset \mathbb{F}_2^n$$
$$m \mapsto i=mG_{in}+e_1 \mapsto c=iG_{out}=\mathscr{G}(m). \quad (55)$$

To derive the generator matrix the algebraic structure of the cyclic codes can be exploited, given by its Galois fields. By definition of cyclic codes, the following polynomial is factorized $$x^n - 1 = (x-1)\prod_{s=1}^{S} G_s(x) \quad (56)$$

in irreducible polynomials $G_s(x)$ of degree $m_s$, which are divisors of m. If $n=2^m-1$ is prime, $m=\log(n+1)$ is also prime and hence all the irreducible polynomials are primitive and of degree $m_s=m$, except one of them, $G_0(x)=x-1$, has degree one. Hence, it holds that $S=(n-1)/m$. As outer generator polynomial $$G_{out}(x) = \prod_{s=S-J+1}^{S} G_s(x) = \sum_{i=0}^{Jm} g_{out,i}x^k$$

several embodiments of the invention choose the product of the last $1 \leq J \leq S$ primitive polynomials $G_s(x)$ yielding a degree Jm=n−k. Each codeword polynomial of degree less than n is then given by $$C(x)=I(x)G_{out}(x) \tag{57}$$

where $I(x)=\Sigma_{a=0}^{k-1} i_a x^a$ is the informational polynomial of degree less than k and represented by the binary information word $i=(i_0, i_1, \ldots, i_{k-1}) \in \mathbb{F}_2^k$, which can be referred to as the inner codeword. Similar, the codeword polynomial C(x) is represented by the CPC codeword $c \in \mathbb{F}_2^n$. A message polynomial $M(x)=\Sigma_{b=0}^{k-m-1} m_b x^b$ of degree less than k−m and R(x)=1 will be mapped to the information polynomial $$I(x)=M(x)G_{in}(x)+1, \tag{58}$$

by the inner generator polynomial $G_{in}(x)=G_1(x)$, which has degree m.

All possible cyclic equivalence classes can be mapped to M(x). For J=1, all the possible S−1 primitive polynomials $G_s(x)$ generate S−1 distinct inner codes. However, the remaining S−2 inner codes will only map $<2^{k-m}$ more message polynomials to codeword polynomials and therefore are not enough to encode an additional bit. Hence, these other inner codewords can be omitted. This has the advantage, that (55) can be written with the subset of the CPC as an affine cyclically permutable code (ACPC), which is given by the polynomial multiplication over $\mathbb{F}_2$ $$C(x)=I(x)G_{out}(x)=(M(x)G_{in}(x)+1)G_{out}(x)=M(x)G(x)+G_{out}(x). \tag{59}$$

Here, a third generator polynomial $G(x)=G_{in}(x)G_{out}(x)$ can be introduced which will be affine translated by the polynomial $G_{out}(x)$. This generator polynomial G(x) will map surjective $\mathbb{F}_2^{k-m}$ to a cyclic code $\mathbb{F}_2^n$ and can therefore be expressed in matrix form as $$mG+g_{out} \in \mathscr{C}_{ACPC} \subset \mathscr{C}_{out} \tag{60}$$

where $g_{out}=(g_{out,0}, \ldots, g_{out,n-k}, 0, \ldots, 0) \in \mathbb{F}_2^n$ and the generator matrix (Toeplitz) is given by k−m shifts of the generator polynomial coefficients $g_0, \ldots, g_{n-(k-m)}$ as $$G = \begin{pmatrix} g_0 & g_1 & \cdots & g_{k-m-1} & \cdots & g_{n-(k-m)} & 0 & \cdots & 0 \\ 0 & g_0 & \cdots & g_{k-m-2} & \cdots & g_{n-(k-m)-1} & g_{n-(k-m)} & \cdots & 0 \\ \vdots & & & & & & & \ddots & \vdots \\ 0 & 0 & \cdots & g_0 & \cdots & & & \cdots & g_{n-(k-m)} \end{pmatrix} \in \mathbb{F}_2^{k-m \times n}. \tag{61}$$

For linear codes, the Euclidean algorithm can be used to compute $x^{n-i}=Q_i(x)G(x)+S_i(x)$ for i=1, ..., k−m, where the remainder polynomials $$S_i(x) = \sum_j s_{i,j} x^j$$

will have degree less than n−(k−m), which allows one to rewrite the Toeplitz matrices as systematic matrices. Here, the check symbols $s_{i,j}$ define the k−m×n systematic generator and n−k+n×n check matrix $$\tilde{G} = [-PI_{k-m}], \tilde{H} = [I_{n-k+m} P^T] \text{ with} \tag{62}$$

$$P = \begin{pmatrix} s_{k-m,0} & \cdots & s_{k-m,n-k+m-1} \\ s_{k-m-1,0} & \cdots & s_{k-m-1,n-k+m-1} \\ \vdots & & \vdots \\ s_{1,0} & \cdots & s_{1,n-k+m-1} \end{pmatrix}$$

such that $\tilde{G}\tilde{H}^T = O_{k-m,n-k+m}$. This allows one to write the cyclic outer code aa $\mathbb{F}_2^{k-m} G = \mathbb{F}_2^{k-m} \tilde{G}$. Of course, each mG and m$\tilde{G}$ can be mapped to different codewords, but this is just a relabeling. Since $\mathbb{F}_2^{k-m} \tilde{G}$ defines a cyclic (n, k−m) code and n is prime, each codeword has n distinct cyclic shifts. The affine translation $g_{out}$ separates each of these n distinct cyclic shifts by mapping them to representatives of distinct cyclically equivalence classes of maximal order. This can provide a very simple encoding rule for each $m \in \mathbb{F}_2^B$:

$$c=m\tilde{G}+g_{out}=\mathcal{G}(m) \in \mathscr{C}_{ACPC}, \tag{63}$$

and decoding rule. Here an ACPC codeword c can be decoded by just subtracting the affine translation $g_{out}$ and cut-off the last B=k−m binary letters to obtain the message word $m \in \mathbb{F}_2^B$, see (62). However, it can be observed that a cyclic shifted codeword $v=cS^l$ and by construction that only one cyclic shift will be an element of $\mathscr{C}_{ACPC}$ and consequently it holds $$\forall j \neq l \mod(n-1): \tilde{c}_j = vS^{-j} - g_{out} \notin \mathbb{F}_2^{k-m}\tilde{G} \Leftrightarrow \tilde{c}_j \tilde{H}^T \neq 0. \tag{64}$$

Hence, it is only necessary to check all n cyclic shifts of the sense-word v to identify the correct cyclic shift l, which is given if $\tilde{c}_l \tilde{H}^T = 0$. If there is an additive error e, process in accordance with various embodiments of the invention can use the error correcting property of the outer cyclic code $\mathscr{C}_{out}$ in (59) to repair the codeword. The systematic matrices can be used $\tilde{G}_{out}$ and $\tilde{H}_{out}$ to represent the outer cyclic code in a systematic way. Note, that each information message i which corresponds to a CPC codeword c will be an element of $\mathbb{F}_2^k \tilde{G}_{out}$. Furthermore, all its cyclic shifts $cS^l$ will be outer cyclic codewords. Hence, by observing the sense-word $$\tilde{v}=cS^l+e \tag{65}$$

and determining its syndrome $s=v\tilde{H}_{out}^T$, which is looked-up in the syndrome table $T_{synd}$ of $\tilde{H}_{out}$ to identify the corresponding coset leader (error-word) e, which recovers the shifted codeword (assuming maximal t errors, bounded-distance decoder) as $$v=\tilde{v}-e, \tag{66}$$

This can allow the receiver to correct up to t=(n−k−1)/2 errors of the cyclic codeword. From the additive error-free sense-word c the process can, as described previously, identify the correct shift $\hat{l}$ from (64) and by taking the last $B$=k letters the original message m. If the error vector e introduces more than t bit flips, the error correction is likely to fail and the chance is high that the receiver will mix up the ACPC codewords and experience a block (word) error. In many embodiments, a low coding rate is utilized for the outer cyclic code $G_{out}$ to reduce the likelihood of such a catastrophic error. In several embodiments, the rate of the outer code can adapt in response to measured channel conditions. In a number of embodiments, the receiver can transmit a message containing at least one of a selected code rate and/or channel measurement to coordinate changing the rate of the outer code in the transmitter.

The identified cyclic shift and fractional CFO estimation (48) yields then the estimated CFO $$\hat{\varphi}=\hat{\theta}+\hat{i}\theta_K. \qquad (67)$$

While specific processes are described above for estimating TO, and/or CFO in addition to correcting bit errors, any of a variety of codes including CRC, CPC, ACPC, and/or any other codes that can be utilized to detect cyclic permutations and/or receiver implementations can be utilized as appropriate to the requirements of specific applications in accordance with various embodiments of the invention. Simulations of various communication systems implemented using BMOCZ schemes and employing cyclic codes to encode message bits in accordance with a number of embodiments of the invention are discussed further below.

Implementation in Matlab

Simulations of communication systems employing MOCZ and cyclic codes can be performed in Matlab by using the function primpoly(m, 'all') to list all primitive polynomials for $\mathbb{F}_{2^m}$. The first in the list can be selected for $G_{in}$ and the product of the last 1 for $G_{out}$. The Euclidean algorithm is implemented by gfdeconv. Note, the decimal value of the binary words can be given by m=m (2)=$\Sigma_b\, m_b 2^b$ and implemented by de2bi(vm). The generator and check matrices can be constructed as well as the syndrome table $T_{synd}$ for the error correction.

FIG. 16 shows the Matlab program (Code) for creating the systematic generator matrix G in line 20, defined by $\tilde{G}$ in (62), and the systematic check matrix tH in line 21, defined by $\tilde{H}$ in (62), as well as the affine shift a in line 22, defined by $g_{out}$ after (60), to encode binary messages m of length B=k−m to ACPC codewords c of length n=$2^m$−1 by (63). Furthermore, a syndrome table Tsynd for the outer cyclic (BCH) code is created in line 30 and the check matrix tHout to correct by the syndrome additive errors in the sense-word $\tilde{v}_1$ as in (66). Note, that the value of k can be chosen from a list, of BCH-(n,k) codes to correct up to t=(n−k−1)/2 errors.

Decoding: First an additive error-correction is performed in the outer code $\mathscr{C}_{out}$, which works as for cyclic codes via the syndrome-table $T_{synd}$ and the check matrix $\tilde{H}_{out}$. First, the syndrome s=v$\tilde{H}_{out}^T$ is computed and looked-up in the syndrome-table to identify the corresponding coset leader (error-word) e, which yields the recovered shifted codeword (assuming maximal t errors, bounded-distance decoder) as $$\tilde{c}=v-e. \qquad (68)$$

From the additive error-free but circular shifted codeword $\tilde{c}$ the process can construct all n shifts, subtract the constant shift vector a=$g_{out}$, and apply the check matrix $\tilde{H}_{out}$ to find the one shift which is most likely the ACPC codeword Example 1. The most non-trivial example of ACPC is for m=3 and l=1, which gives $$n=2^3-1=7, k=7-3=4, B=4-1=1 \qquad (69)$$

This is also the Hamming (7, 4) code with minimal distance $d_{min}$=3 and hence can correct 1 bit error. The code is also perfect.

Example 2. For K=n=31 it is possible to get for t=2 error corrections a message length of k=21 in a cyclic BCH-(31, 21) code from which it is possible to construct a CPC of cardinality $$|\mathscr{C}_{CPC}| = \sum_{i=1}^{4} 2^{5(i-1)+1} = 2^1+2^6+2^{11}+2^{16} = 6750 \geq 2^{16}. \qquad (70)$$

This allows communication systems in accordance with several embodiments of the invention to encode B=16=k−m bits. The cardinality can be optimal for any cyclic (31,26) code (54)

$$|\mathscr{C}_{CPC}| = \qquad (71)$$

$$\frac{M_c}{m} = \frac{2^{21}-2}{31} = 2\frac{2^{20}-1}{2^5-1} = \sum_{i=0}^{3} 2^{5i+1} = 2^1+2^6+2^{11}+2^{16} = 6750.$$

Figure 10A:
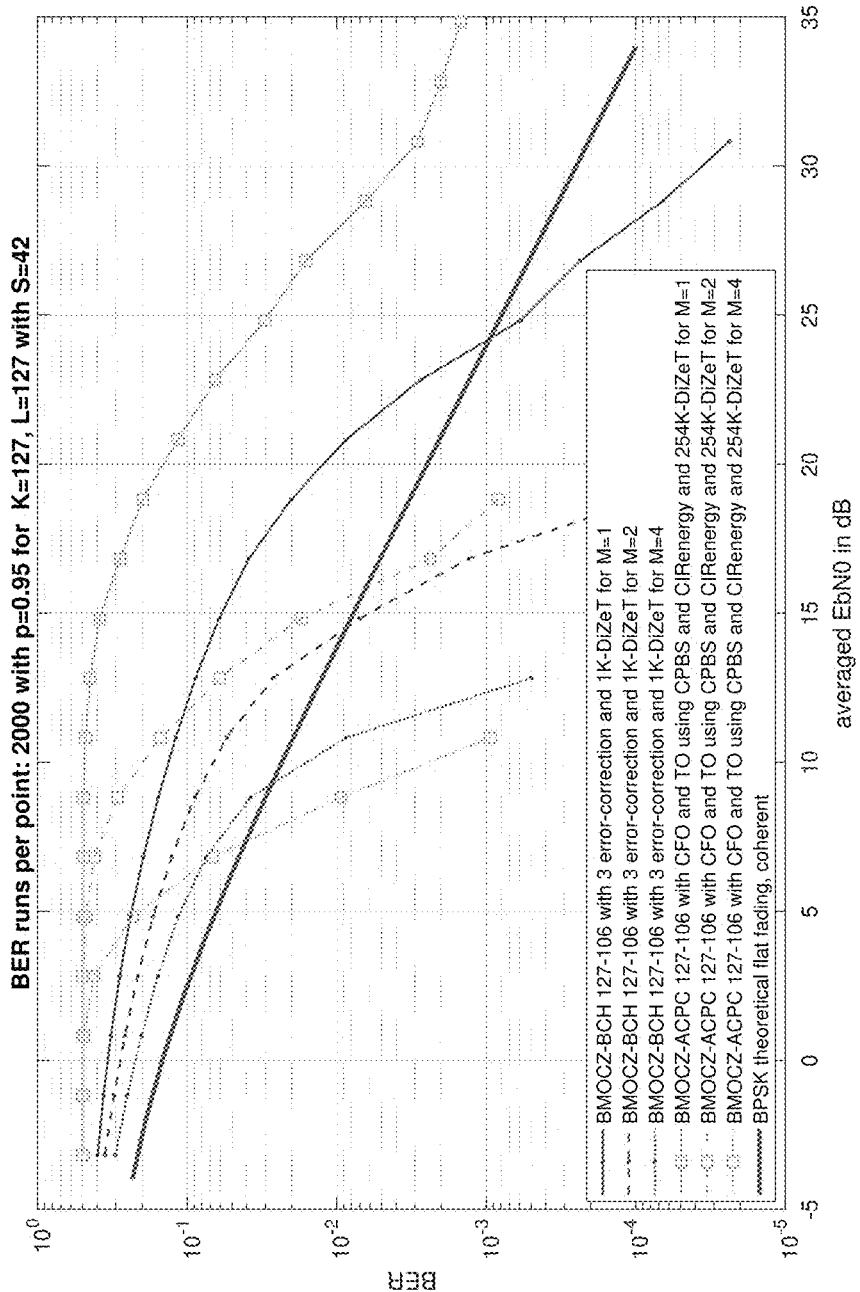
FIG. 10A shows simulated results for a SIMO system for M=1, 2, 4 receive antennas over 2000 runs per point at p=0.95 and S=42. In addition, results are presented for a BCH code with no carrier frequency offset and timing offset and an ACPC code with a carrier frequency offset and timing offset using the CIRED Algorithm and the CPBS algorithm.
Figure 10B:
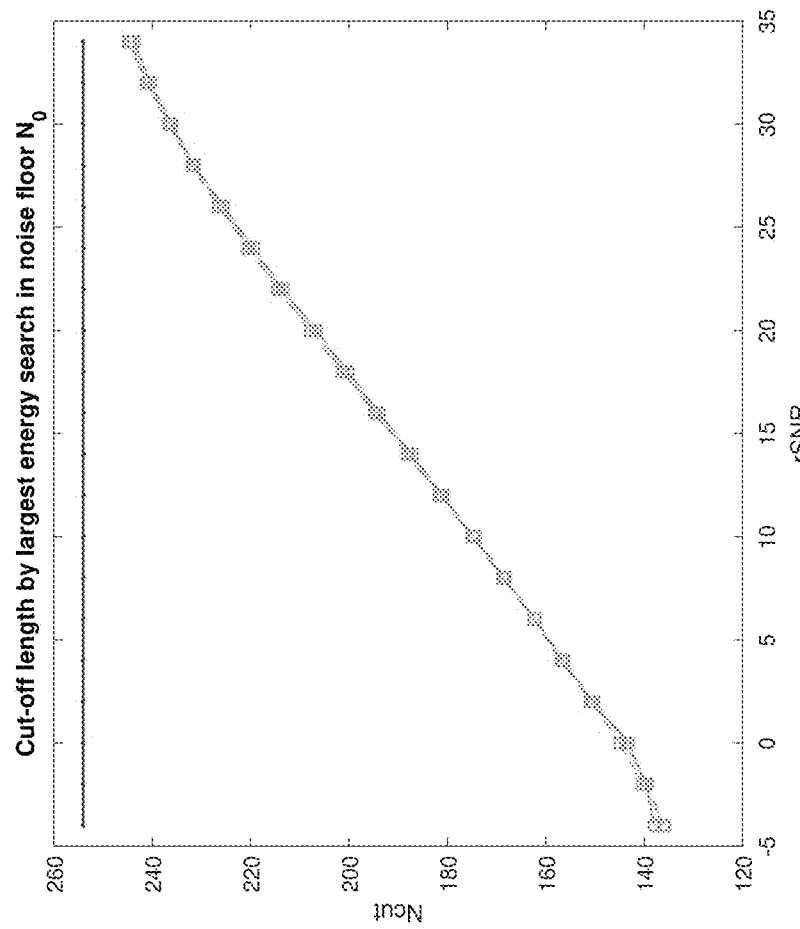
FIG. 10B shows timing offset and carrier frequency offset estimation errors for M=1, 2 and M=4 receive antennas in the simulations shown in FIG. 10A.

The next example would be for n=127, which is also simulated in FIGS. 10A and 10B. Unfortunately, the next. Mersenne prime is only at 8191, which may not constitute a short-packet length in many applications. However, other CPC constructions can be utilized in certain embodiments of the invention, which do not require Mersenne prime lengths n or even binary alphabets. For example only prime lengths can be required or/and non-binary alphabet extensions which allow the usage of M-ary MOCZ schemes. In many embodiments, CPCs are utilized with alphabet size q, given as a power of a prime, and block length n=$q^m$−1 for any positive integer m. Hence, for q=2 and a binary cyclic code (n=$2^m$−1, k, $d_{min}$) the code can result in ($2^k$−1)/n CPC codewords. An example can be given for n=15=$2^4$−1 and k=8, $d_{min}$=4 where in is not a. Mersenne prime number and the maximal bound (54) of ($2^8$−1)/15=17 is achieved, allowing a transmitter to encode B=4 bits and a receiver to correct 2 bit errors, which is very close to the BCH code (15, 7) with 2 bit error correction.

Consideration should also be given to what may be the shortest non-trivial CPC, which can be addressed without cyclic code construction, but also with no error correction capabilities.

Example 3. For n=3 the communication system may only have 23=8 binary words of length 3 which have 4 different cyclic permutable codewords $c_1$=1, $c_2$=(1, 1, 0), $c_3$=(1, 0, 0), $c_4$=0 allowing the transmitter to encode B=2 bits of information with no error correction. However, this code allows a TO estimation, as well as a CIR estimation. By omitting $c_1$ and $c_4$, i.e., by dropping one bit of information, an estimate can be obtained with the DiZeT oversampling decoder for any possible CFO.

While specific codes and encoder and decoder implementations are described above, communication systems in accordance with various embodiments of the invention can use any of a variety of codes that are rotation invariant and/or provide bit error correction capabilities as appropriate to the requirements of specific applications in accordance with various embodiments of the invention. The simulation of specific communication systems in accordance with a number of embodiments of the invention is discussed further below.

Simulations

Figure 11:
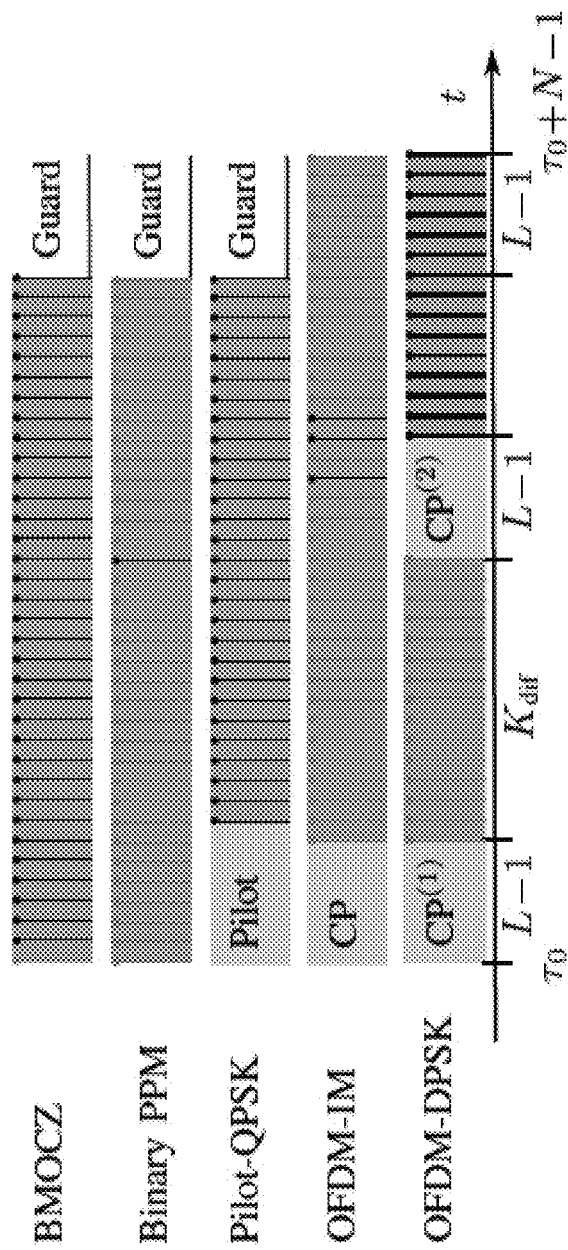
FIG. 11 shows a comparison to two successive OFDM-DPSK blocks, one OFDM-IM, a pilot and QPSK, and a BMOCZ block in time-domain. The solid bars denote the used subcarriers/zeros.

Monte-Carlo simulations of communication systems in accordance with various embodiments of the invention were performed using MatLab 2017a the bit-error-rate (BER) over averaged $E_b/N_0$ and rSNR under various channel settings and block lengths K. The transmit and receive time was in all schemes N=K+L over which the CIR h of length L was assumed to be static, see FIG. 11. Here, we schematic illustrate the usage of the N sample resources of the BMOCZ, Binary PPM, QPSK with delta Pilot, OFDM-IM of order 3 and final OFDM-Differential PSK, utilizing two consecutive OFDM symbols with CP1 and CP2 cyclic prefix. The blue marked area gives the data samples, where the black samples denote the actual active samples for the data. Note, a Guard or CP requires always at least L−1 samples, where a Pilot requires L samples. Therefore, the energy per bit was $E_b$=B/N with B=$\|m\|_1$ which is the inverse of the spectral efficiency ρ=N/B. In each simulation run, the CIR coefficients were redrawn according to the channel statistic given by (3) with decay exponent p≤1 and support s. The CFO ϕ was drawn uniformly from [0, 2π) and the timing-offset $\tau_0$ uniformly form [0, N]. Furthermore, the additive distortion was also drawn from an i.i.d. Gaussian distribution $\mathcal{CN}$ (0, $N_0$), which was scaled to obtain various received SNR and $E_b/N_0$ values, see FIG. 12A. Here the oversampled BMOCZ-ACPC encoded scheme in purple filled circles only loses 4 dB in performance compared to the BCH encoded BMOCZ in the low to mediocre SNR regimes. The fractional CFO can be compensated in high SNR regime by increasing the oversampling factor, see gray squared line, Due to the embedded error correcting and a complete failure if a wrong CPC codeword is detected, the BER and BLER (block-error-rate) are almost identical over received SNR for BMOCZ-ACPC, see purple filled circle line in FIG. 12B.

Of course, it would be also possible to detect a wrong decoding and request a retransmit.

Multiple Receive Antennas

For a receiver with M antennas, receive antenna diversity can be exploited, since each antenna can receive the transmit signal over an independent CIR realization (best case). Due to the short wavelength in the mmWave band large antenna arrays with λ/2 spacing can be easily installed on small devices. It was assumed in all simulations:

The B information bits m∈$\mathbb{F}_2^B$ are drawn uniformly.

All signals arrive with the same timing-offset $\tau_0$ at the M receive antennas (dense antenna array, fixed relative antenna positions (no movements)).

The clock-rate for all M antennas is identical, hence all received signals have the same CFO.

The maximal CIR length L, sparsity level S, and PDP p are the same for all antennas.

Each received signal experiences an independent noise and CIR realization, with sparsity pattern $s_m$∈{0, 1}$^L$ for |supp($s_m$)|=S and $h_m$∈$\mathbb{C}^L$ where $h_{m,l}$=$\mathcal{CN}$ (0, $s_{m,l}p^l$).

The DiZeT decoder (44) for BMOCZ without TO and CFO, can be implemented in a straight forward manner relative to a single-input-multiple-output SIMO antenna system:

$$\hat{m}_k = \begin{cases} 1, & \sum_{m=1}^{M} |y_m \tilde{D}_R F^*|^2_{Q(k-1)} < R^{K-2} \sum_{m=1}^{M} |y_m \tilde{D}_{R^{-1}} F^*|^2_{Q(k-1)} \\ 0, & \text{else} \end{cases} \quad (72)$$

CFO Estimation for Multiple Receive Antennas

In many embodiments, the fractional CFO is estimated by (48) for M received signals $y_m$ $$\hat{q} = \arg\min_{q\in[Q]} \sum_{k=1}^{K} \min\left\{\sum_{m=1}^{M} |\tilde{y}_m \tilde{D}_R F_{QK}|_{Qk\oplus_{\tilde{N}} q}, \sum_{m=1}^{M} |\overline{\tilde{y}_m} \tilde{D}_R F_{QK}|_{Qk\oplus_{\tilde{N}} q}\right\}. \quad (73)$$

Figure 12A:
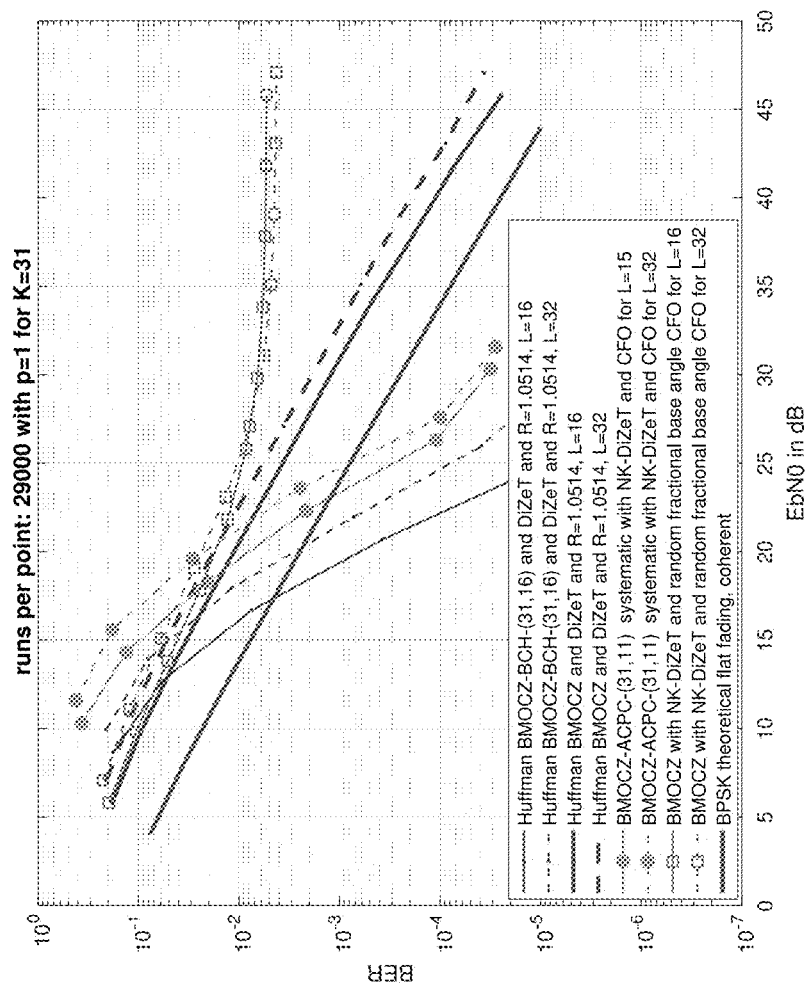
FIGS. 12A and 12B shows BER respectively block-error-rate (BLER) simulation results for arbitrary carrier frequency with an ACPC-(31,11) code for B=11 bits. The $E_b/N_0$ averaged over the fading channel is defined here as $1/BN_0$ for B information bits.
Figure 12B:
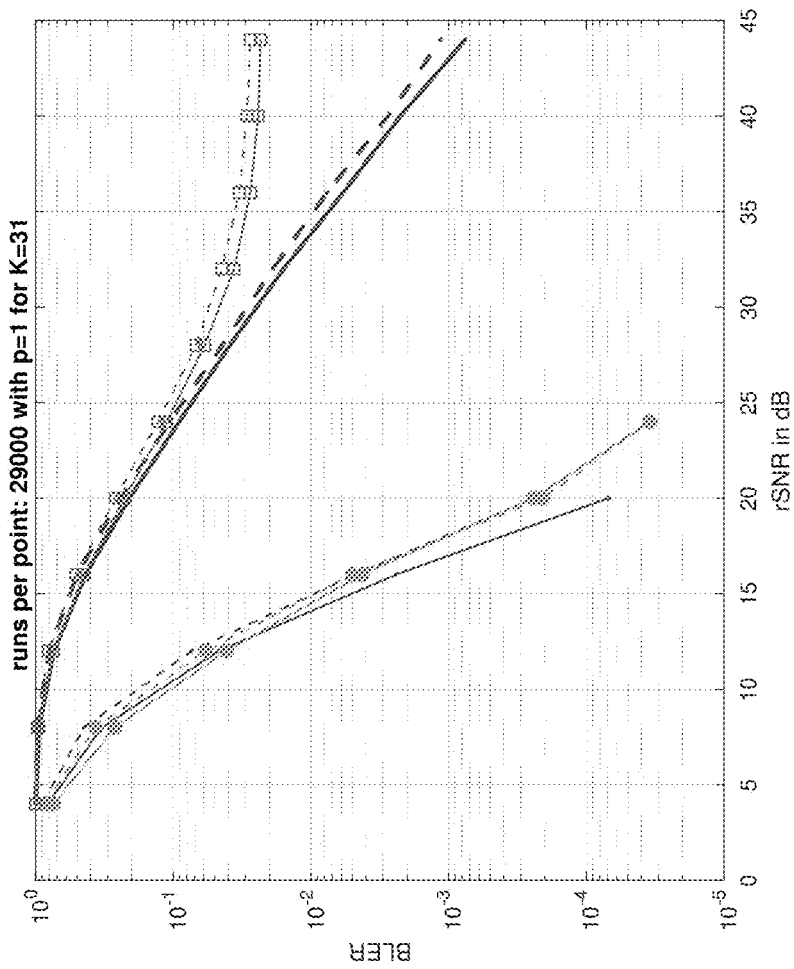

The effect of different coding rates on BER and block error rate (BLER) for the BMOCZ-ACPC-(K, B) scheme with K=31 transmitted zeros and channel lengths L=16, 32 with flat power profile p=1 is shown in FIGS. 12A and 12B. If the coding rate is decreased to B/K=6/31 ≃1/5, allowing up to 5 bit error corrections, a BLER of 10$^{-1}$ can be achieved at almost 6 dB received SNR, which is 6 dB better as for the coding rate 16/31 ≃1/2. Hence, if power is an issue, the coding rate can be decreased accordingly to approach a low SNR regime, at the cost of data rate. It can be seen that for a very sparse and fast decaying power delay profile, the performance loss will be 1-4 dB, especially if the channel length becomes in the order of the signal length.

Timing and Effective Channel Length Estimation

Figure 13:
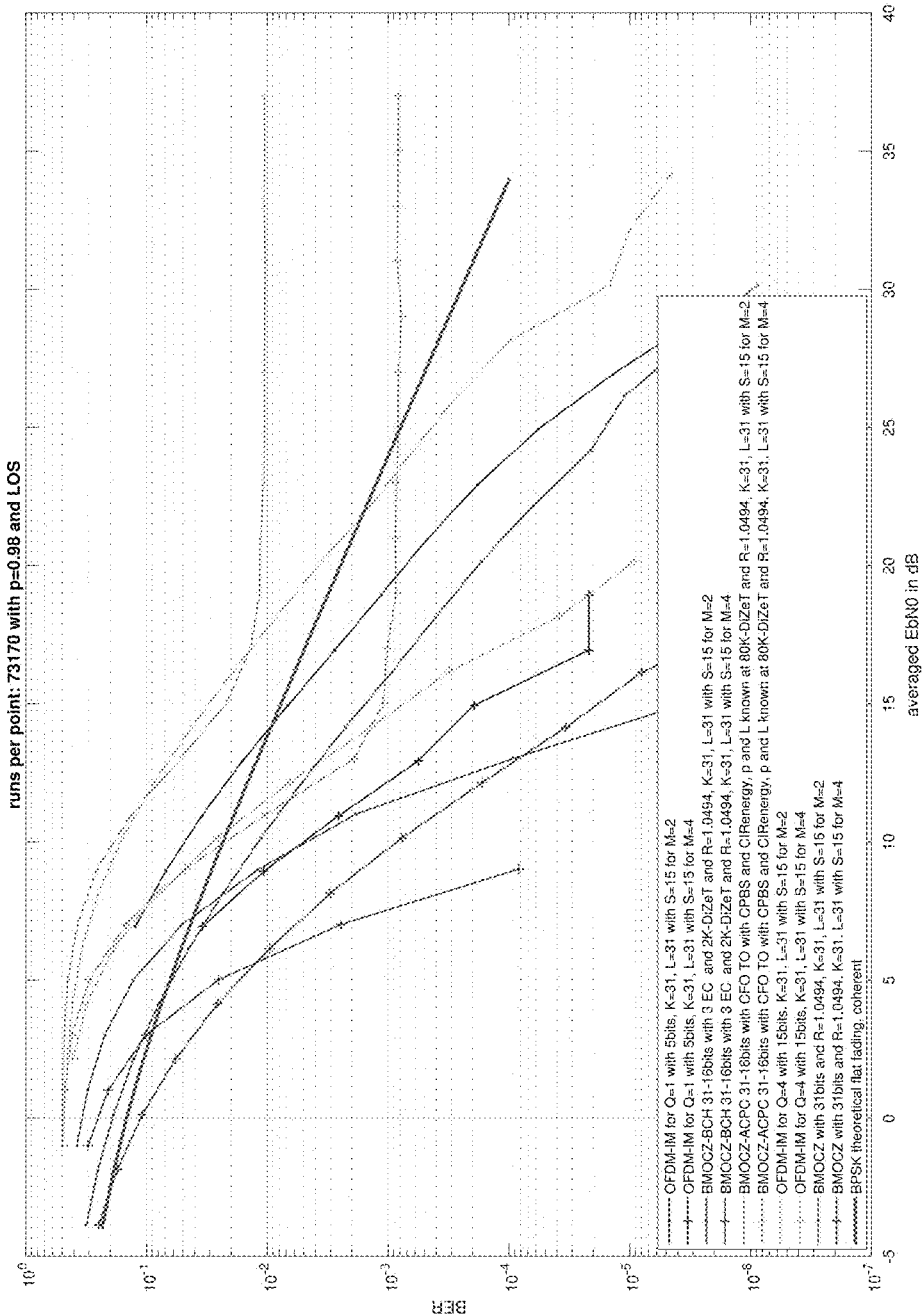
FIG. 13 shows BER over $E_b/N_0$ with M=2 and 4 antennas for BMOCZ-ACPC-(31,16) distorted by timing and carrier frequency offsets (green curves). OFDM-IM is shown without carrier frequency offsets and timing offsets.

A random integer timing offset can be chosen in $\tau_0$∈{0, 1, 2..., N−1} in FIG. 13 and with an exponential power delay profile exponent p=0.98 and dominant LOS path. In the CPIS algorithm (i.e. Algorithm 1 from FIG. 6) and CIRenergy algorithm (i.e. algorithm 2 from FIG. 8) the sum of all received antenna samples is used in combination with the sum of the noise powers $$|r_n|^2 = \sum_{m=1}^{M} |r_{m,n}|^2 \text{ and } \sigma^2 = MN_0. \quad (74)$$

Indeed, if the CIR length is larger with exponential decay, a wrong TO estimation yields to less performance degradation as for shorter lengths, since the last channel tap will be much smaller in average power. A simulation can be performed by choosing randomly for each simulation, consisting of D different noise powers $N_0$.

Each binary plain message m will result in a codeword c∈$\mathbb{F}_2^K$, which corresponds to a normalized BMOCZ symbol x∈$\mathbb{C}^{K+1}$. The CIR can be normalized at the transmitter to $\tilde{h}$=h/$\mathbb{E}[\|h\|^2]$, where the average energy of the CIR is given by (36) as the expected power delay profile in s $$E_{S,h} = \mathbb{E}[\|h\|^2] = \sum_{l=0}^{L-1} s_l p^l. \quad (75)$$

For each selected sparsity pattern of the CIR, normalized CIR energy is obtained if selecting random channel taps by the law of large numbers. By averaging over the sparsity pattern, this can result in a large deviation of the CIR energy and would require many more simulations, therefore the average power was calculated with knowledge of the sparsity patterns, i.e., by knowing the support realization.

Comparison to Noncoherent Schemes

Figure 14A:
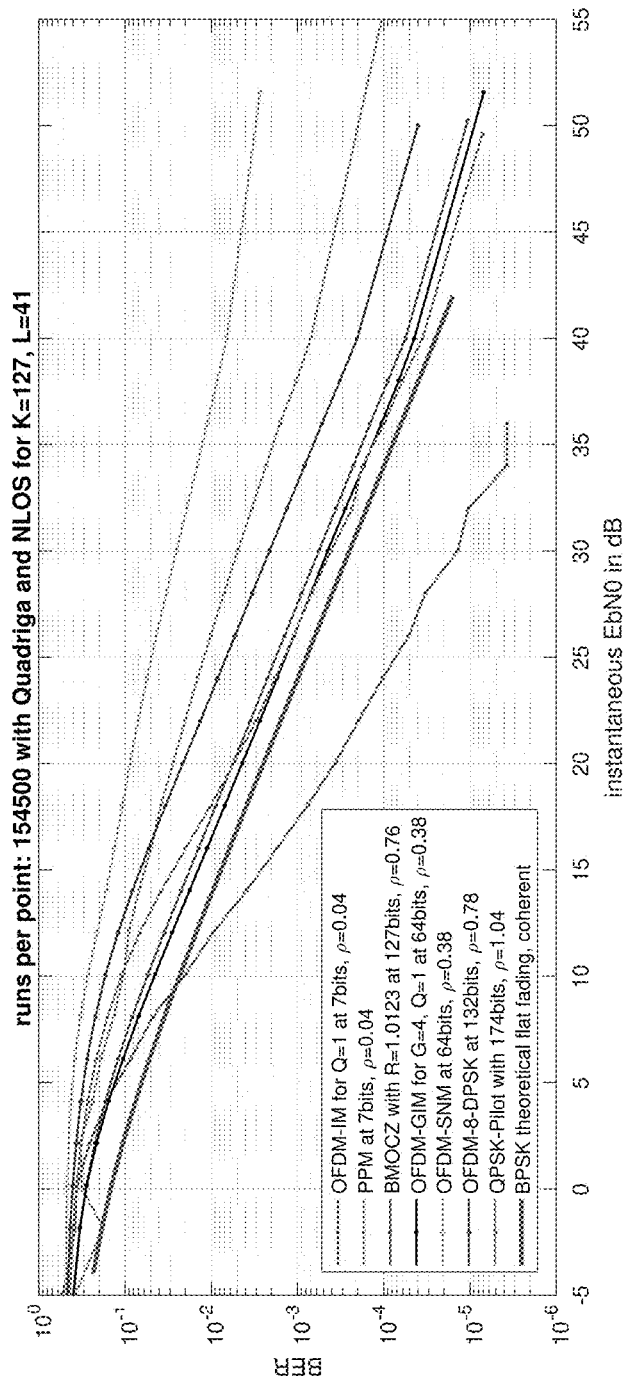
FIG. 14A shows simulated BER of blind schemes over instantaneous SNR corrected by spectral efficiency.
Figure 14B:
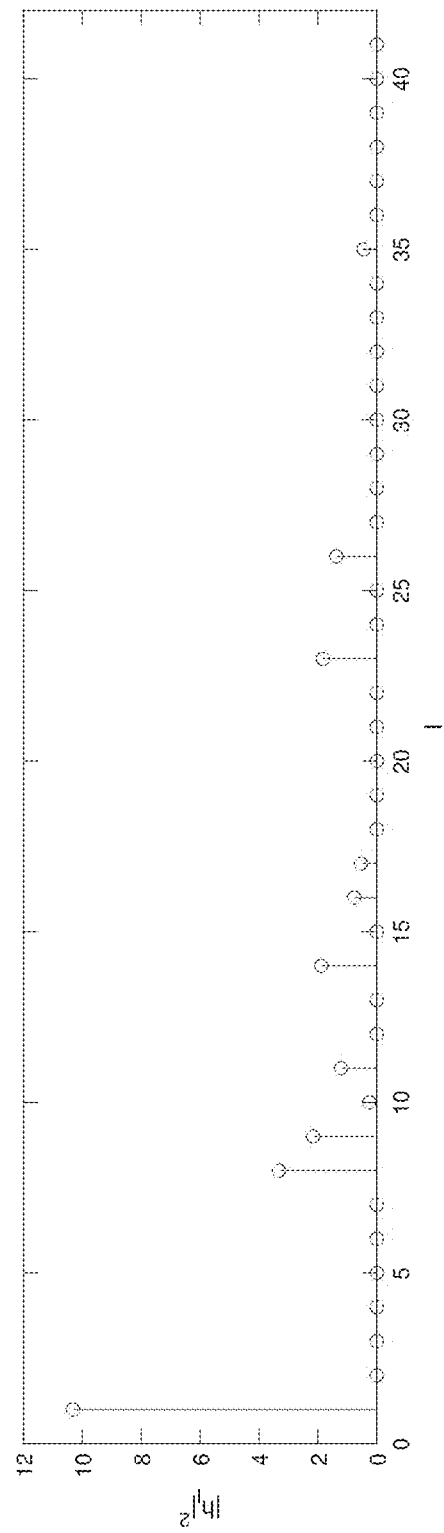
FIG. 14B shows random channel realizations with Quadriga simulations at maximal delay spread L=41.
Figure 15A:
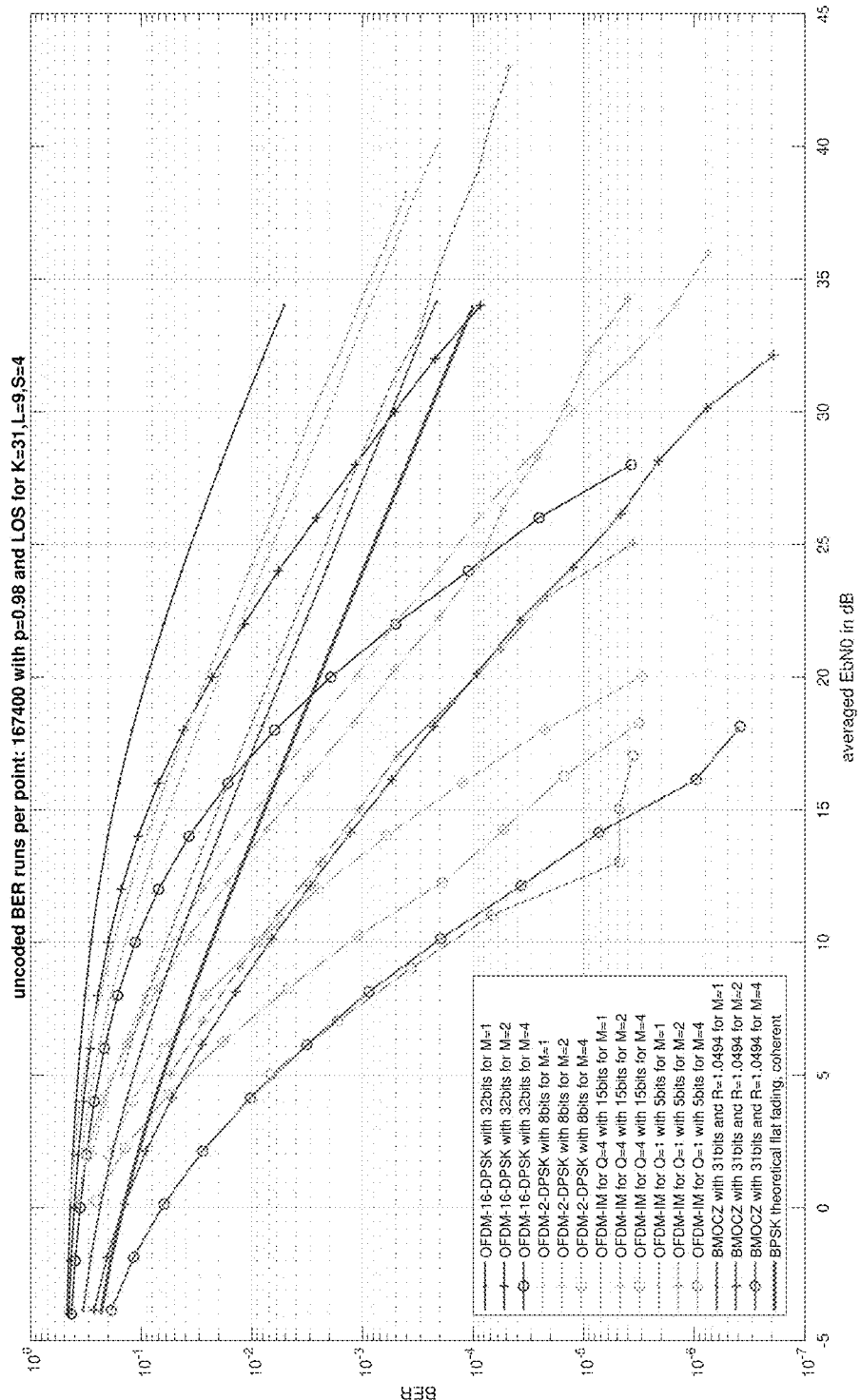
FIG. 15A shows a comparison of BMOCZ to OFDM-IM, -GIM, -DPSK with 2 OFDM symbols, and Pilot-QPSK for 1 and 4 antennas at maximal CIR length L=9.
Figure 15B:
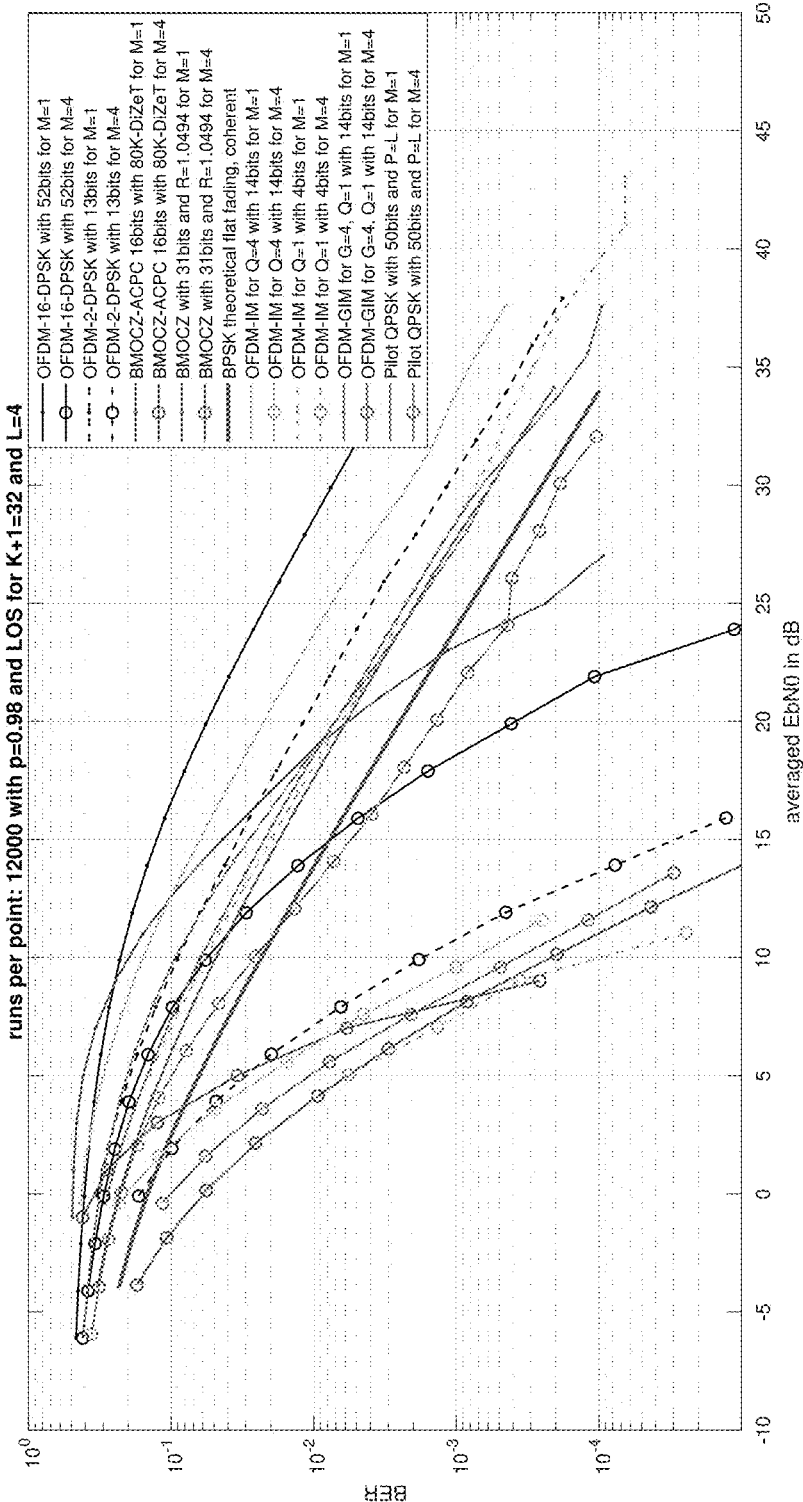
FIG. 15B shows a comparison of BMOCZ to OFDM-IM, -GIM, -DPSK with 2 OFDM symbols, and Pilot-QPSK for 1 and 4 antennas at maximal CIR length L=4.

First, a comparison is performed without TO and CFO between BMOCZ and OFDM and pilot based schemes, in FIGS. 14A and 14B with a single antenna where the CIR is generated from the simulation framework Quadriga and finally in FIGS. 15A and 15B with multiple-receive antennas.

Pilot and SC-FDE with QPSK. A pilot impulse $$\sqrt{\frac{E}{2}} \delta_0$$

of length P=L can be used to determine the CIR and K+1−L symbols to transmit data via QPSK in a single-carrier (SC) modulation by a frequency-domain-equalization (FDE).

Applying FDE, QPSK or QAM modulated OFDM subcarriers K+1−L can be decoded. The energy E is split evenly between the pilots and data symbols, which can result in better BER performance for high SNR, see FIG. 15

OFDM-Index-Modulation (IM). A comparison can also be performed with respect to: OFDM-IM with Q=1 and Q=4 active subcarriers out of $K_{IM}$=K+1 and to OFDM-Group-Index-Modulation (GIM) with Q=1 active subcarriers in each group of size C=4. To obtain an OFDM symbol a cyclic-prefix is added which requires $K_{IM} \geq L$. For OFDM systems, the CFO will result in a circular shift of the $K_{IM}$ subcarriers and hence create the same confusion as for BMOCZ. The only difference is, that OFDM operates only on the unit circle, whereas BMOCZ operates on two circles inside and outside the unit circle. Note, in OFDM-IM a cyclic permutable code is not applicable, since the information for example with Q=1 is a cyclic shift, which is exactly what the CFO introduces. For more active subcarriers Q>1 and grouping the carriers in groups, ICI free IM schemes can be deployed. A group size of G=4 seems to perform the best for OFDM-IM. However, this will require L<<K which is not the proposed regime for MOCZ.

OFDM-Differential-Phase-Shift-keying (DPSK). Two successive OFDM blocks can be used to encode differentially the bits via Q-PSK over $K_{dif}$ subcarriers. To ensure the same transmit and receive lengths as for BMOCZ the BMOCZ symbol length K+1 can be split in two OFDM symbols with cyclic prefix $x_{CP}^{(1)}$ and $x_{CP}^{(2)}$ of equal length $N_{dif}$=N/2, where N=K+L is chosen to be even. Furthermore, to include a CP of length L−1 in each OFDM block, it is required that $N_{dif}$=(K+L)/2≥2L−1 resulting in the requirement. K≥3L−2. If L is even and K=nL for some 2<n∈ℕ it is possible to obtain $K_{dif}$=$N_{dif}$−L+1=(n−1)L/2+1 subcarriers in each OFDM block. The shortest transmission time is then given for even L with a=3 by N=4L, resulting in $K_{dif}$=L+1 subcarriers. Modulating them with Q-PSK allows to transmit. (L+1) log Q bits differentially. To match the spectral-efficiency of BMOCZ as best as possible, it is possible to select Q=8 to encode 3 bits per subcarrier and hence B=(L+1)3=(K/3+1)3=K+3 message bits, which is 3 bits more than BMOCZ.

The encoding of the DPSK can be done relative to the first. OFDM block i=1, which will transmit PSK constellation points as with phase zero $s_k^{(1)}$=1 respectively data phases $s_k^{(2)} = e^{j 2\pi q_k/Q}$ with $q_k$=bi2de($m_{(k-1)log(Q)+1}, \ldots, m_{k\ log(Q)}$) for k=1, . . . , $K_{dif}$. Hence, in time domain, it is possible to obtain $$x=(x_{CP}^{(1)}, x_{CP}^{(2)}), x_{CP}^{(i)}=(CP^{(i)}, x^{(i)}), CP^{(i)}= (x_{N_{dif}-L+1}^{(i)}, \ldots, x_{N_{dif}-1}^{(i)}), x^{(i)}=F^* s^{(i)} \quad (76)$$

for i=1, 2. Here x will be also normalized.

After removing the CP at the receiver the received data symbols in frequency domain via the mth antenna for the kth carrier is given by $$R_{m,k}^{(i)} = H_{m,k} s_k^{(i)} + W_{m,k}^{(i)} \quad (77)$$

where it is possible to consider $\{W_{m,k}^{(i)}\}$ as independent circularly symmetric Gaussian random variables and $H_{m,k} \in \mathbb{C}$ the channel coefficient of the kth subcarrier. Hence, each subcarrier can be seen as a Rayleigh flat fading channel and the decision variable can be used for a hard-decoding of M antennas $$\hat{q}_k = \underset{q \in |Q|}{\mathrm{argmin}} \left| \frac{1}{M} \sum_{m=1}^{M} R_{m,k}^{(2)} \overline{R_{m,k}^{(1)}} - e^{j\frac{2\pi q}{Q}} \right|^2 = \mathrm{int}\left( \frac{Q}{2\pi} \angle \left( \frac{1}{M} \sum_{m=1}^{M} R_{m,k}^{(2)} \overline{R_{m,k}^{(1)}} \right) \mathrm{mod} Q \right) \quad (78)$$

Here int(•) rounds to the nearest integer. It is possible to ignore here a possible weighting by knowledge of SNR.
Simulations with Quadriga Channel Simulator Version 2.0 of the Quadriga channel simulator was used to generate random CIRs for the Berlin outdoor scenario ("BERLIN__UMa_NLOS"), with NLOS at a carrier frequency $f_c$=4 Ghz and bandwidth W=150 Mhz, see FIG. 14. In the simulation, the transmitter and receiver are stationary using omnidirectional antennas (λ/2). The transmitter might be a base station mounted at 10m altitude and the receiver might be a ground user with ground distance 20m. The LOS distance is then ≈22m.
Computationally Complexity Since the Q times oversamnpled DiZeT decoder is realized by the QK-point IDFT, computationally complexity an be reduced for Mersenne primes K, if the chosen oversampling factor Q is relatively prime to K. Since K is prime, Q can be chosen to be not a multiple of K. Since N=K+L, L≠mK need only be chosen for m∈ℕ so that Q=N is relatively prime to K, i.e., only have one as a common divisor. In this case the QK-DFT can be efficiently computed by the prime-factor algorithm (PFA), which is as efficient at the FFT for lengths of powers of two. During simulation in Matlab, a speed improvement by a factor of 10 in the oversampled DiZeT decoder was observed for K=31 when switching from L=31 to L=32.

As can readily be appreciated, the simulations described above form a basis for implementation of communication systems in accordance with various embodiments of the invention using appropriate programmable and/or custom integrated circuits. While specific simulations are described above, any of a variety of simulations and testing processing can be performed in order to finalize a transmitter and/or receiver design as appropriate to the requirements of specific applications in accordance with various embodiments of the invention.

Although the present invention has been described in certain specific aspects, many additional modifications and variations would be apparent to those skilled in the art. It is therefore to be understood that the present invention can be practiced otherwise than specifically described including transmitters and receivers that communicate via any of a variety of communication modalities using MOZ without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A receiver, comprising:
   a demodulator configured to down convert and sample a received continuous-time signal to obtain a received discrete-time baseband signal and over sample the received discrete-time baseband signal, where the received discrete-time baseband signal includes at least one of a timing offset (TO) and a carrier frequency offset (CFO);
   a decoder configured to decode a plurality of decoded information bits from the received discrete-time baseband signal by:

determining an estimated TO for the received discrete-time baseband signal to identify a received symbol;

determining a plurality of zeros of a z-transform of the received symbol;

identifying zeros from the plurality of zeros that encode received bits by identifying and correcting a fractional rotation in the plurality of zeros resulting from the CFO; and decoding the plurality of decoded information bits based upon a plurality of received bits using a cycling register code (CRC).

2. The receiver of claim 1, wherein the receiver receives the continuous-time transmitted signal over a multipath channel.

3. The receiver of claim 1, wherein the z-transform of the discrete-time baseband signal comprises a zero for each of a plurality of encoded bits.

4. The receiver of claim 1, wherein each zero in the z-transform of the discrete-time baseband signal is limited to being one of a set of conjugate-reciprocal pairs of zeros.

5. The receiver of claim 4, wherein:

each conjugate reciprocal pair of zeros in the set of conjugate-reciprocal pairs of zeros comprises:

an outer zero having a first radius that is greater than one; and an inner zero having a radius that is the reciprocal of the first radius;

where the inner and outer zero have phases that are the same phase; and the radii of the outer zeros in each pair of zeros in the set of conjugate-reciprocal pairs of zeros in each pair of zeros in the set of conjugate-reciprocal pairs of zeros are evenly spaced over one complete revolution.

6. The receiver of claim 1, wherein the cycling register code is a cyclically permutable code (CPC).

7. The receiver of claim 6, wherein the CPC is extracted from a Bose Chaudhuri Hocquenghem (BCH) code.

8. The receiver of claim 6, wherein the CPC is extracted from a primitive BCH code.

9. The receiver of claim 6, wherein the CPC has a code length that is a Mersenne prime.

10. The receiver of claim 1, wherein the CRC is generated by an inner code and an outer code which are combined in a non-linear fashion.

11. The receiver of claim 10, wherein the outer code is an outer cycling register code having a lower code rate than the inner code.

12. The receiver of claim 10, wherein the outer code is a cyclically permutable code (CPC).

13. The receiver of claim 10, wherein the CRC is an affine CPC (ACPC) code.

14. The receiver of claim 13, wherein the ACPC is characterized by being attainable using a cyclic inner code having codewords of an inner codeword length, which is affine translated by a given binary word of the inner codeword.

15. The receiver of claim 1, wherein the decoder is configured to determine the estimated TO by measuring energy over an expected symbol length with a sliding window in the sampled signal.

16. The receiver of claim 1, wherein the decoder is configured to measure energy over an expected symbol length by convolving samples with a universal Huffman sequence of the expected symbol length comprising two impulses at the beginning and the end of the expected symbol length.

17. The receiver of claim 1, wherein the decoder is configured to determine the estimated TO by identifying a set of three energy peaks that yield a maximum energy sum over an expected symbol length.

18. The receiver of claim 1, wherein the decoder is configured to determine a most likely set of zeros for the z-transform of the discrete-time baseband signal used to generate the transmitted signal based upon the received symbol.

19. The receiver of claim 1, wherein the decoder is configured to determine the plurality of received bits by performing a weighted comparison of samples of the z-transform of the received symbol with each zero in a set of zeros.

20. The receiver of claim 1, wherein the receiver comprises a plurality of receive antennas and the decoder determines the plurality of decoded information bits by combining values derived from the samples of a plurality of continuous-time signals received by the plurality of receive antennas to perform decoding.

* * * * *

UNITED STATES PATENT AND TRADEMARK OFFICE
CERTIFICATE OF CORRECTION

PATENT NO. : 11,368,196 B2
APPLICATION NO. : 17/204762
DATED : June 21, 2022
INVENTOR(S) : Philipp Walk et al.

Page 1 of 1

It is certified that error appears in the above-identified patent and that said Letters Patent is hereby corrected as shown below:

In the Claims

Column 35: (Claim 3, Line 15), replace "the discrete-time" with --the received discrete-time--; (Claim 5, Line 30), replace "the radii of the outer zeros" with --the first radii of the outer zeroes--. Column 36: (Claim 14, Lines 11-12), replace "the inner codeword" with --the inner codeword length--; (Claim 15, Line 16), replace "sampled signal" with --the continuous-time signal--; (Claim 18, Line 29), replace "the discrete-time" with --the received discrete-time--; (Claim 18, Line 30), replace "the transmitted signal" with --the continuous-time signal--; (Claim 20, Line 40), replace "the samples" with --samples--.

Signed and Sealed this
Thirteenth Day of September, 2022

Katherine Kelly Vidal
*Director of the United States Patent and Trademark Office*